(12) United States Patent
Harada et al.

(10) Patent No.: US 8,348,283 B2
(45) Date of Patent: Jan. 8, 2013

(54) SUSPENSION CONTROL APPARATUS AND VEHICLE CONTROL APPARATUS

(75) Inventors: Naofumi Harada, Yokohama (JP); Yoichi Kumemura, Yokohama (JP); Tatsuya Gankai, Chiba (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 140 days.

(21) Appl. No.: 13/071,824

(22) Filed: Mar. 25, 2011

(65) Prior Publication Data
US 2011/0241299 A1 Oct. 6, 2011

(30) Foreign Application Priority Data

Mar. 31, 2010 (JP) .................................. 2010-83846
Sep. 22, 2010 (JP) ................................ 2010-212514

(51) Int. Cl.
*B60G 17/06* (2006.01)
*B60W 10/22* (2006.01)
*B60W 30/02* (2012.01)

(52) U.S. Cl. ......................................... 280/5.5; 701/37
(58) Field of Classification Search ............... 280/5.504, 280/5.505, 5.506, 5.507, 5.513, 5.5; 701/37, 701/38
See application file for complete search history.

(56) References Cited

U.S. PATENT DOCUMENTS

| | | | | |
|---|---|---|---|---|
| 5,781,873 A | * | 7/1998 | Sasaki ............................... | 701/37 |
| 6,092,011 A | * | 7/2000 | Hiramoto ......................... | 701/37 |
| 6,711,482 B2 | * | 3/2004 | Shiino et al. ..................... | 701/37 |
| 2005/0178628 A1 | * | 8/2005 | Uchino et al. ................... | 188/379 |

FOREIGN PATENT DOCUMENTS
JP 2003-11635 1/2003
* cited by examiner

Primary Examiner — Faye M Fleming
Assistant Examiner — Keith Frisby
(74) Attorney, Agent, or Firm — Wenderoth, Lind & Ponack, LLP

(57) ABSTRACT

A suspension control apparatus selectively performs at least one of: compression-stroke control performed when a wheel load is increased, for setting a damping-force characteristic of at least one of damping-force variable dampers, which is provided on a side of at least one wheel whose wheel load is to be increased among a plurality of wheels, to a hard side in an early stage of a compression stroke and switching the damping-force characteristic to a soft side in a latter stage of the compression stroke; extension-stroke control performed when the wheel load is increased, for setting the damping-force characteristic to the soft side in an early stage of an extension stroke and switching the damping-force characteristic to the hard side in a latter stage of the extension stroke; compression-stroke control performed when the wheel load is reduced, for setting the damping-force characteristic of at least one of the damping-force variable dampers, which is provided on a side of at least one wheel whose wheel load is to be reduced, to the soft side in the early stage of the compression stroke and switching the damping-force characteristic to the hard side in the latter stage of the compression stroke; and extension-stroke control performed when the wheel load is reduced, for setting the damping-force characteristic to the hard side in the early stage of the extension stroke and switching the damping-force characteristic to the soft side in the latter stage of the extension stroke.

12 Claims, 22 Drawing Sheets

SUSPENSION CONTROL APPARATUS AND VEHICLE CONTROL APPARATUS

BACKGROUND OF THE INVENTION

The present invention relates to a suspension control apparatus and a vehicle control apparatus, which are mounted to, for example, a vehicle such as a four-wheel automobile so as to be suitably used for damping the vibrations of the vehicle.

In general, a suspension control apparatus is mounted to a vehicle such as an automobile as described in, for example, Japanese Patent Application Laid-open No. 2003-11635. The suspension control apparatus includes a damping-force adjustable shock absorber provided between a vehicle-body side and each axle side. A damping-force characteristic obtained by the shock absorber is variably controlled according to a vehicle attitude which is changed along with a braking operation of a brake or the like.

The above-mentioned type of suspension control apparatus of the prior art is used in combination with a vehicle stability control apparatus to perform control for variably switching the damping-force characteristic, in order to reduce a change in vehicle attitude generated along with, for example, a steering operation and the braking operation of the vehicle so as to improve running stability. Specifically, the control is performed so that the damping-force characteristic of the shock absorber is set to a soft side during an extension stroke and is set to a hard side during a compression stroke on the side of a wheel to be braked, to which the braking force is to be applied, and the damping-force characteristic of the shock absorber is set to the hard side during the extension stroke and is set to the soft side during the compression stroke on the side of a wheel which is not to be braked, to which the braking force is not applied. As a result, a wheel load of the wheel to be braked is increased transiently.

The inventors of the present invention focused attention on the wheel load of the wheel during the compression stroke in the suspension control apparatus of the prior art and found that a maximum amount of increase in wheel load was reduced although a response to increase the wheel load was rapid when the damping force was set to the hard side as compared with the case where the damping force was set to the soft side. Moreover, the inventors of the present invention also focused attention on the wheel load of the wheel during the extension stroke and found that a maximum amount of wheel-load loss (reduction in wheel load) was reduced although a response to reduce the wheel load was rapid when the damping force was set to the hard side as compared with the damping force was set to the soft side.

Therefore, if the responsiveness to increase or lose the wheel load is improved for the wheel load during one of the extension stroke and the compression stroke, the maximum amount of increase or loss in wheel load is reduced. Therefore, the responsiveness and the maximum amount cannot be both improved at the same time. On the other hand, if the responsiveness is lowered, the maximum amount is increased. Therefore, the responsiveness and the maximum amount cannot be both reduced at the same time. Thus, it is found that the suspension control apparatus of the prior art has a problem in that only any one of the responsiveness and the maximum amount can be improved or reduced during any of the compression stroke and the extension stroke of the shock absorber.

SUMMARY OF THE INVENTION

The present invention has been made to solve the above-mentioned problem in the prior art, which was found by inventors of the present invention, and has an object to provide a suspension control apparatus and a vehicle control apparatus, which are capable of controlling responsiveness to increase and reduce a wheel load and an absolute amount of an increase and a reduction in wheel load so as to more safely control an operation of a vehicle.

In order to achieve the above-mentioned object, a suspension control apparatus according to the present invention includes: damping-force adjustable shock absorbers provided between a vehicle body of a vehicle and wheels, each of the damping-force adjustable shock absorbers having a damping-force characteristic adjustable between a soft side and a hard side; and a controller for variably controlling the damping-force characteristic of each of the damping-force adjustable shock absorbers. The controller performs at least one control of: compression-stroke control performed when a wheel load is increased, for setting the damping-force characteristic of at least one of the damping-force adjustable shock absorbers, which is provided on a side of at least one wheel whose wheel load is to be increased among the plurality of wheels, to the hard side in an early stage of a compression stroke and then switching the damping-force characteristic to the soft side in a latter stage of the compression stroke; extension-stroke control performed when the wheel load is increased, for setting the damping-force characteristic of the at least one of the damping-force adjustable shock absorbers, which is provided on the side of the at least one wheel whose wheel load is to be increased among the plurality of wheels, to the soft side in an early stage of an extension stroke and then switching the damping-force characteristic to the hard side in a latter stage of the extension stroke; compression-stroke control performed when the wheel load is reduced, for setting the damping-force characteristic of at least one of the damping-force adjustable shock absorbers, which is provided on a side of at least one wheel whose wheel load is to be reduced among the plurality of wheels, to the soft side in the early stage of the compression stroke and then switching the damping-force characteristic to the hard side in the latter stage of the compression stroke; and extension-stroke control performed when the wheel load is reduced, for setting the damping-force characteristic of the at least one of the damping-force adjustable shock absorbers, which is provided on the side of the at least one wheel whose wheel load is to be reduced among the plurality of wheels, to the hard side in the early stage of the extension stroke and then switching the damping-force characteristic to the soft side in the latter stage of the extension stroke.

DETAILED DESCRIPTION OF THE INVENTION

Figure 1:
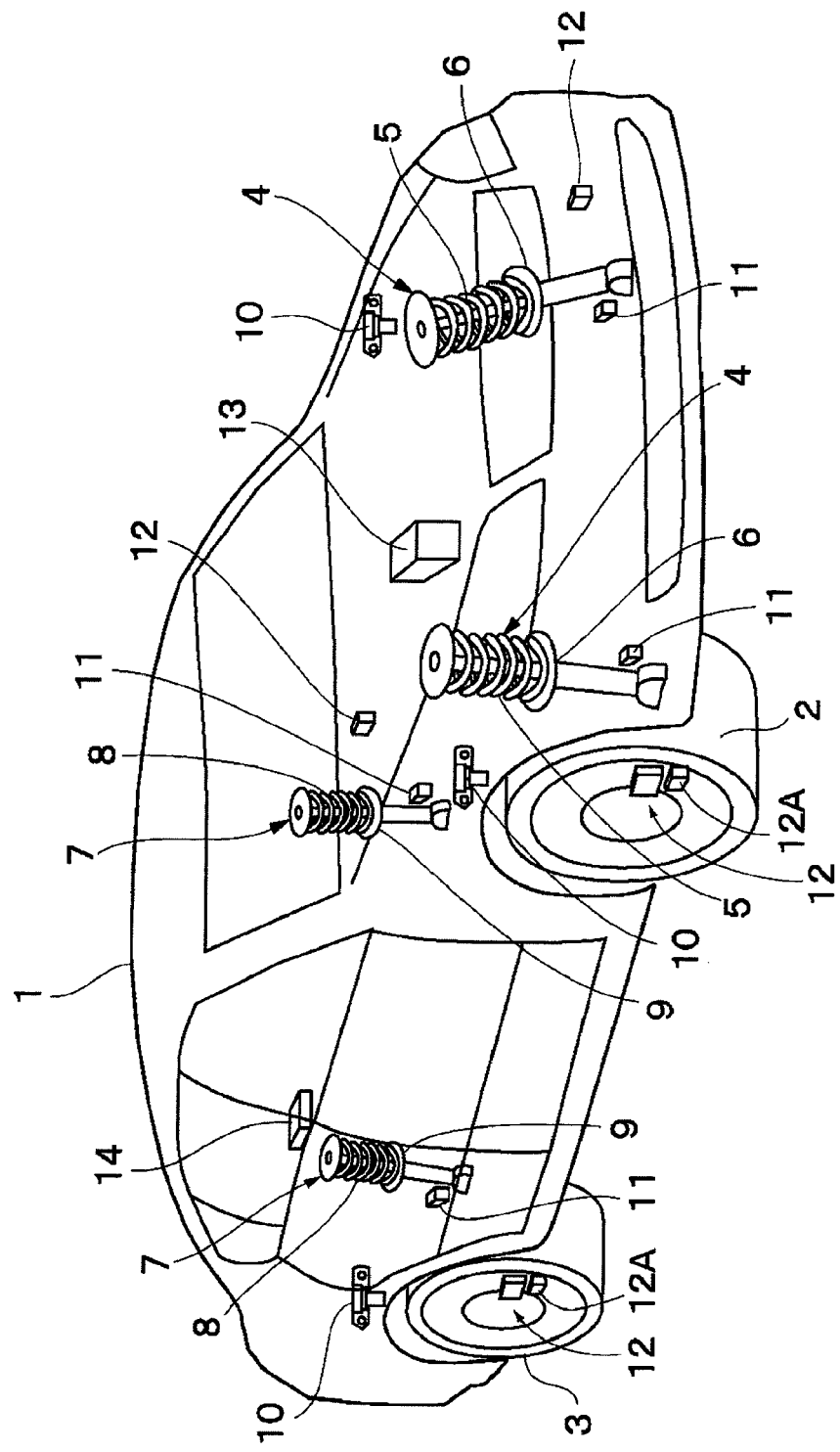
FIG. 1 is a perspective view illustrating a four-wheel automobile in which suspension control apparatuses according to a first embodiment of the present invention are used.

Hereinafter, the case where a suspension apparatus comprising a suspension control apparatus according to embodiments of the present invention is used for, for example, a four-wheel automobile, is described as an example in detail according to the accompanying drawings.

FIGS. 1 to 9 illustrate a first embodiment of the present invention. In FIGS. 1 to 9, a vehicle body 1 constitutes a body of a vehicle. Below the vehicle body 1, for example, right and left front wheels 2 (only one thereof is illustrated) and right and left rear wheels 3 (only one thereof is illustrated) are provided.

A front-wheel side suspension apparatus 4 is provided between the left front wheel 2 and the vehicle body 1. Similarly, another front-wheel side suspension apparatus 4 is provided between the right front wheel 2 and the vehicle body 1. The left suspension apparatus 4 includes a left suspension spring 5 (hereinafter, referred to simply as "spring 5"), and a left damping-force adjustable shock absorber 6 (hereinafter, referred to as "damping-force variable damper 6") provided in parallel to the spring 5 between the left front wheel 2 and the vehicle body 1. Similarly, the right suspension apparatus 4 includes a right spring 5, and a right damping-force variable damper 6 provided in parallel to the spring 5 between the right front wheel 2 and the vehicle body 1.

A rear-wheel side suspension apparatus 7 is provided between the left rear wheel 3 and the vehicle body 1. Similarly, another rear-wheel side suspension apparatus 7 is provided between the right rear wheel 3 and the vehicle body 1. The left suspension apparatus 7 includes a left suspension spring 8 (hereinafter, referred to simply as "spring 8"), and a left damping-force adjustable shock absorber 9 (hereinafter, referred to as "damping-force variable damper 9") provided in parallel to the spring 8 between the left rear wheel 3 and the vehicle body 1. Similarly, the right suspension apparatus 7 includes a right spring 8, and a right damping-force variable damper 9 provided in parallel to the spring 8 between the right rear wheel 3 and the vehicle body 1.

Each of the damping-force variable damper 6 included in each of the suspension apparatuses 4 and the damping-force variable damper 9 included in each of the suspension apparatus 7 is configured by using a damping-force adjustable hydraulic shock absorber. Each of the damping-force variable dampers 6 and 9 is provided with a damping-force adjustment mechanism so as to continuously adjust a damping-force characteristic thereof from a hard characteristic to a soft characteristic. The damping-force adjustment mechanism includes a damping-force adjustment valve and an actuator (not shown). The damping-force adjustment valve does not necessarily need to be configured so as to continuously change the damping-force characteristic and may be configured so as to intermittently adjust the damping-force characteristic in two steps, or three or more steps. As the damping-force adjustment valve, a well-known structure such as a pressure-control type valve for controlling a pilot pressure of a damping-force generating valve and a flow-rate control type valve for controlling a passage area can be used.

A plurality of sprung acceleration sensors 10 are provided to the vehicle body 1. The sprung acceleration sensors 10 are provided so as to detect a vertical vibration acceleration on the vehicle body 1 side corresponding to a sprung side. One of the sprung acceleration sensors 10 is provided to the vehicle body 1 in the vicinity of an upper end (projecting end of a rod) of the damping-force variable damper 6 on the side of the right front wheel 2, and another one of the sprung acceleration sensors 10 is provided to the vehicle body 1 in the vicinity of an upper end (projecting end of a rod) of the damping-force variable damper 6 on the side of the left front wheel 2. The sprung acceleration sensor 10 is also provided to the vehicle body 1 in the vicinity of an upper end (projecting end of a rod) of the damping-force variable damper 9 on the side of each rear wheel 3. Each of the sprung acceleration sensors 10 constitutes a road-surface condition detector for detecting a road-surface condition during the running of the vehicle as the vertical vibration acceleration to output a detection signal to a controller 14 described below. The sprung acceleration sensors 10 may be provided to all the four wheels or may also be provided to three of the four wheels, that is, to the right and left front wheels and any one of the right and left rear wheels. Alternatively, only one sprung acceleration sensor 10 may be provided to the vehicle body so that the vertical vibration acceleration at other wheels may be estimated from values of other longitudinal/horizontal acceleration sensors.

A plurality of unsprung acceleration sensors 11 are provided. Each of the unsprung acceleration sensors 11 is provided to the side of each of the front wheels 2 and each of the rear wheels 3 of the vehicle. Each of the unsprung acceleration sensors 11 detects the vertical vibration acceleration for each wheel on the side of each of the right and left front wheels 2 and the right and left rear wheels 3. Then, a detection signal is output to the controller 14 described below.

An acceleration signal on the unsprung (axle) side, which is obtained by each of the unsprung acceleration sensors 11, is subjected to subtraction processing with respect to an acceleration signal on the sprung (vehicle body 1) side, which is obtained from each of the sprung acceleration sensors 10 in computation processing (see S4 illustrated in FIG. 3) performed by the controller 14 described below. As a result, a relative acceleration of the damper between the sprung side and the unsprung side is calculated. Moreover, by integrating the relative acceleration between the sprung side and the unsprung side, a vertical relative velocity between each of the front wheels 2 and the vehicle body 1, and between each of the rear wheels 3 and the vehicle body 1 is calculated.

A braking device 12 such as a hydraulic disc brake and a drum brake is provided to the side of each of the front wheels 2 and the rear wheels 3 of the vehicle. Each of the braking devices 12 includes a wheel-cylinder hydraulic-pressure sensor 12A. The wheel-cylinder hydraulic-pressure sensors 12A individually detect brake hydraulic pressures of the respective wheels on the side of the right front wheel 2, on the side of the left front wheel 2, on the side of the right rear wheel 3, and on the side of the left rear wheel 3 so as to output respective detection signals to the controller 14 described below. Specifically, the controller 14 determines which braking device 12, of the braking devices 12 on the sides of the right and left front wheels 2 and the right and left rear wheels 3, performs a braking operation, based on the detection signal from each of the wheel-cylinder hydraulic-pressure sensors 12A so as to determine a braked wheel, which is illustrated as S11 of FIG. 4. An electromagnetic brake may also be used as the braking device 12. In this case, an ammeter can be used in place of the wheel-cylinder hydraulic-pressure sensor 12A. As the braking device, a regenerative brake using an electric generator may be used in combination.

The wheel-cylinder hydraulic-pressure sensor 12A provided for each wheel constitutes means for detecting the braked wheel. The braked wheel may be determined by using, for example, a signal output from a vehicle stability control apparatus 13 described below. Therefore, the means for detecting the braked wheel may be configured by means other than the wheel-cylinder hydraulic-pressure sensor 12A.

The vehicle stability control apparatus 13 is provided to the vehicle body 1 side. The vehicle stability control apparatus 13 computes a running state of the vehicle based on signals from various sensors (not shown), for example, a steer-angle sensor, a longitudinal acceleration sensor, a yaw-rate sensor, and a wheel-velocity sensor, which are mounted to the vehicle, to perform stability control during the running of the vehicle based on the results of computation in the following manner.

Specifically, the vehicle stability control apparatus 13 detects, for example, occurrence of understeer (state in which the vehicle tends to run outward in a turning direction for a steer angle) due to side skid on the side of the front wheels 2 or oversteer (state in which the vehicle tends to run inward in a turning direction for a steer angle) due to side skid on the side of the rear wheels 3 and computes a braking force required for each of the right and left front wheels 2 and the right and left rear wheels 3 so as to bring the vehicle back to a stabilized state according to the running state of the vehicle. Then, the vehicle stability control apparatus 13 actuates a brake hydraulic-pressure control device 13A based on the results of computation to perform braking control (increase, reduce, or release a braking force) independently for each of the wheels, to thereby control a turning moment and a deceleration force of the vehicle. In this manner, the control for ensuring turning stability and course-tracing performance is performed.

The brake hydraulic-pressure control device 13A corresponds to braking-force control means of the present invention. The brake hydraulic-pressure control device 13A includes a pump and a control valve and supplies a hydraulic pressure to the control device 12 as needed. The braking-force control means is configured by a current control device when the electromagnetic brake is used.

Figure 2:
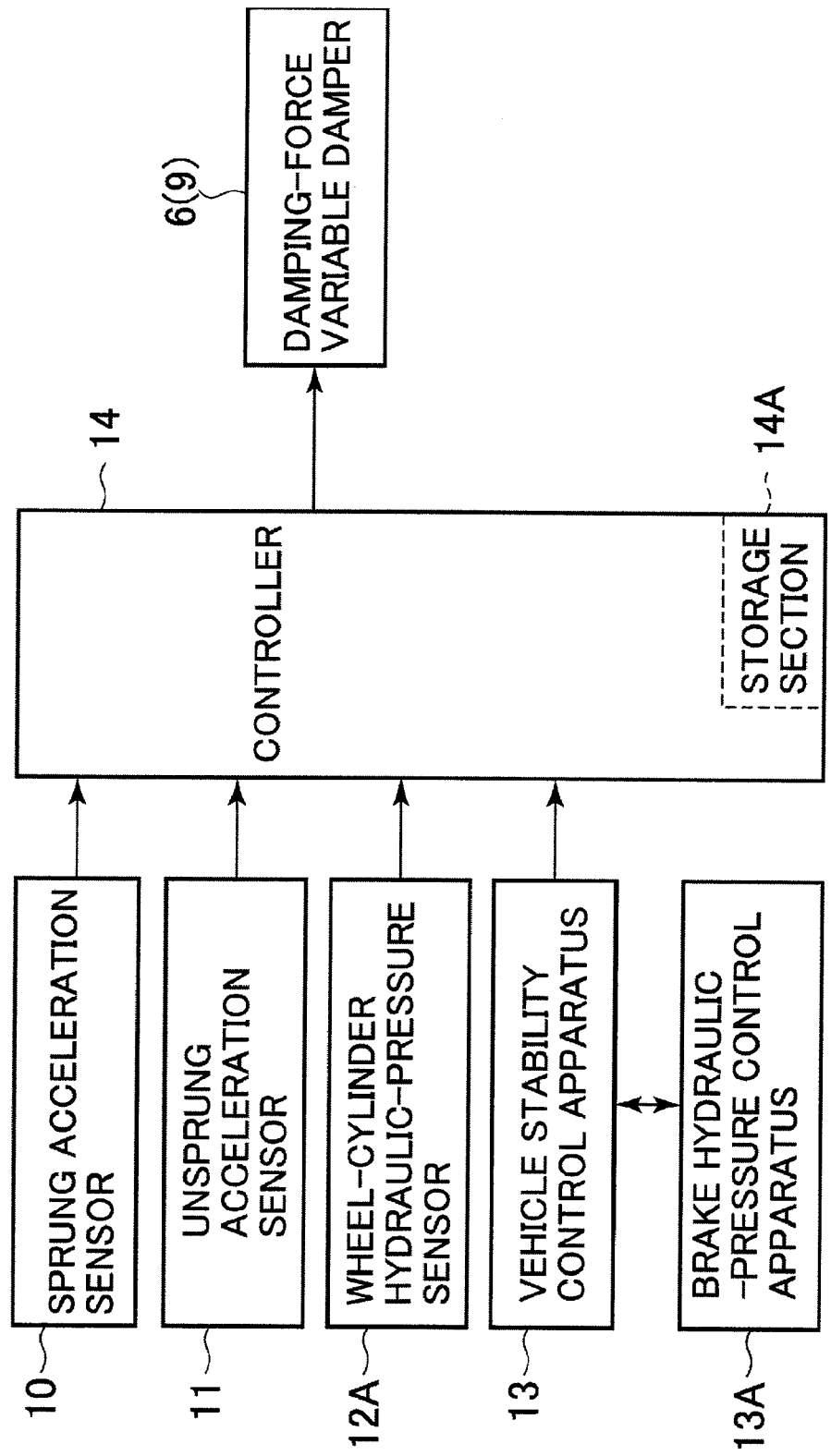
FIG. 2 is a control block diagram illustrating the suspension control apparatus according to the first embodiment.

The controller 14 corresponding to control means includes a microcomputer. As illustrated in FIG. 2, an input side of the controller 14 is connected to the sprung acceleration sensors 10, the unsprung acceleration sensors 11, the wheel-cylinder hydraulic-pressure sensors 12A, and the vehicle stability control apparatus 13, whereas an output side of the controller 14 is connected to actuators (not shown) of the damping-force variable dampers 6 and 9.

Figure 3:
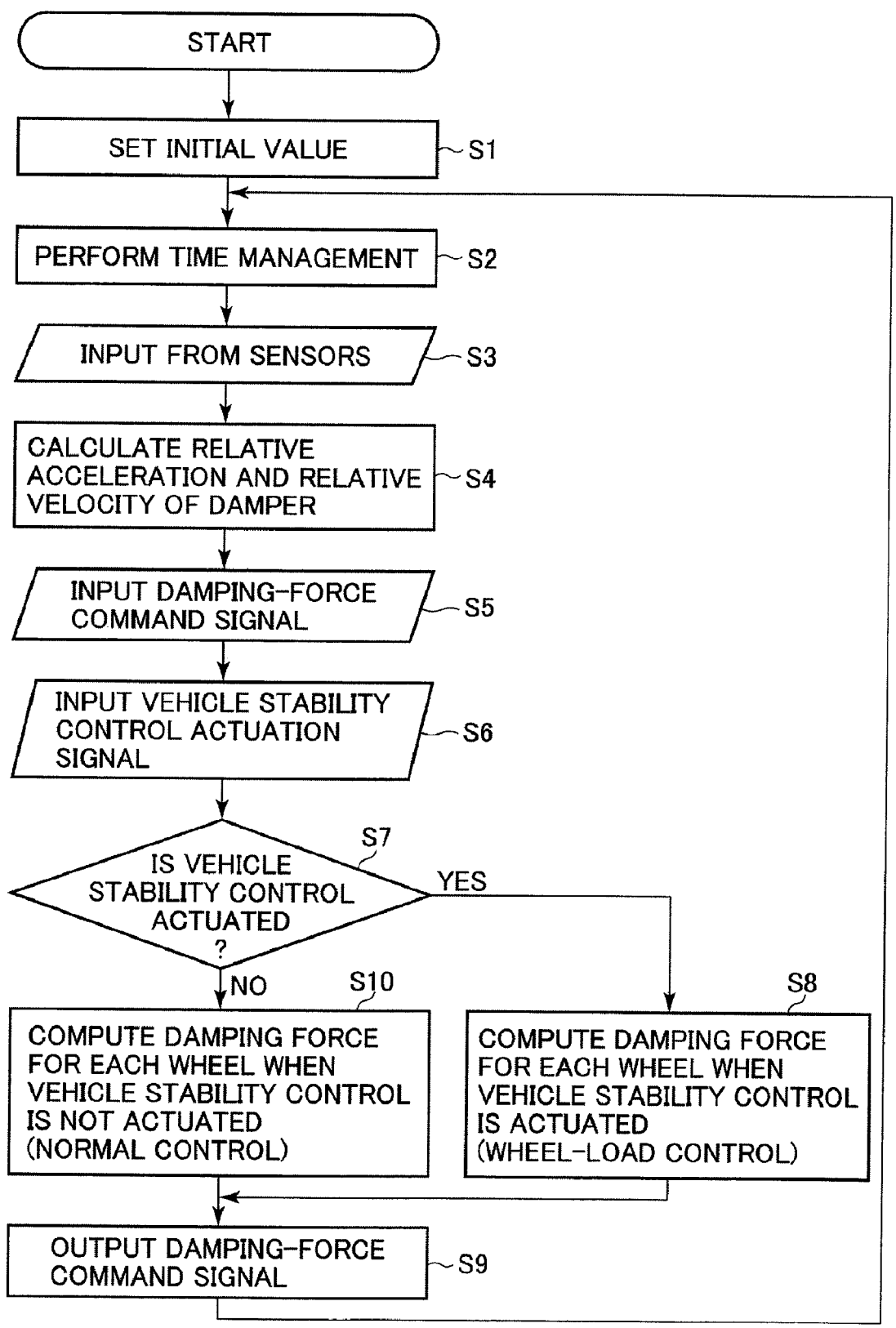
FIG. 3 is a flowchart illustrating damping-force control processing for each wheel, performed by a controller of FIG. 2.
Figure 4:
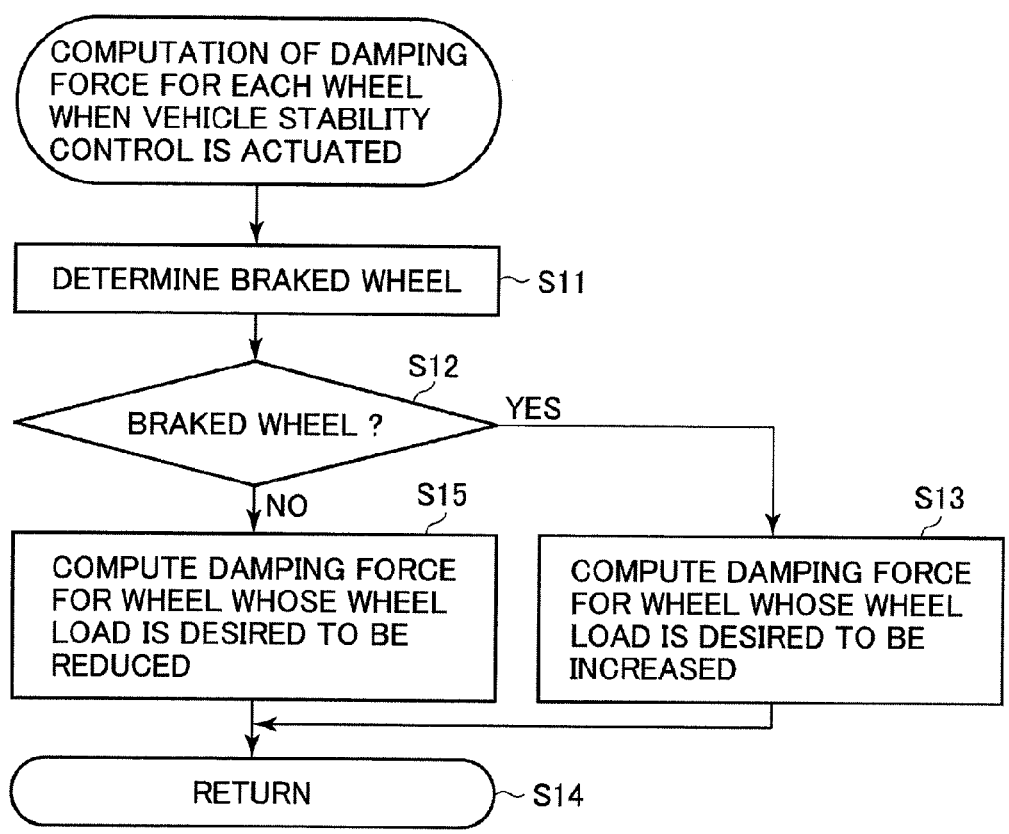
FIG. 4 is a flowchart illustrating damping-force computation processing performed in Step S8 of FIG. 3 when vehicle stability control is actuated.
Figure 5:
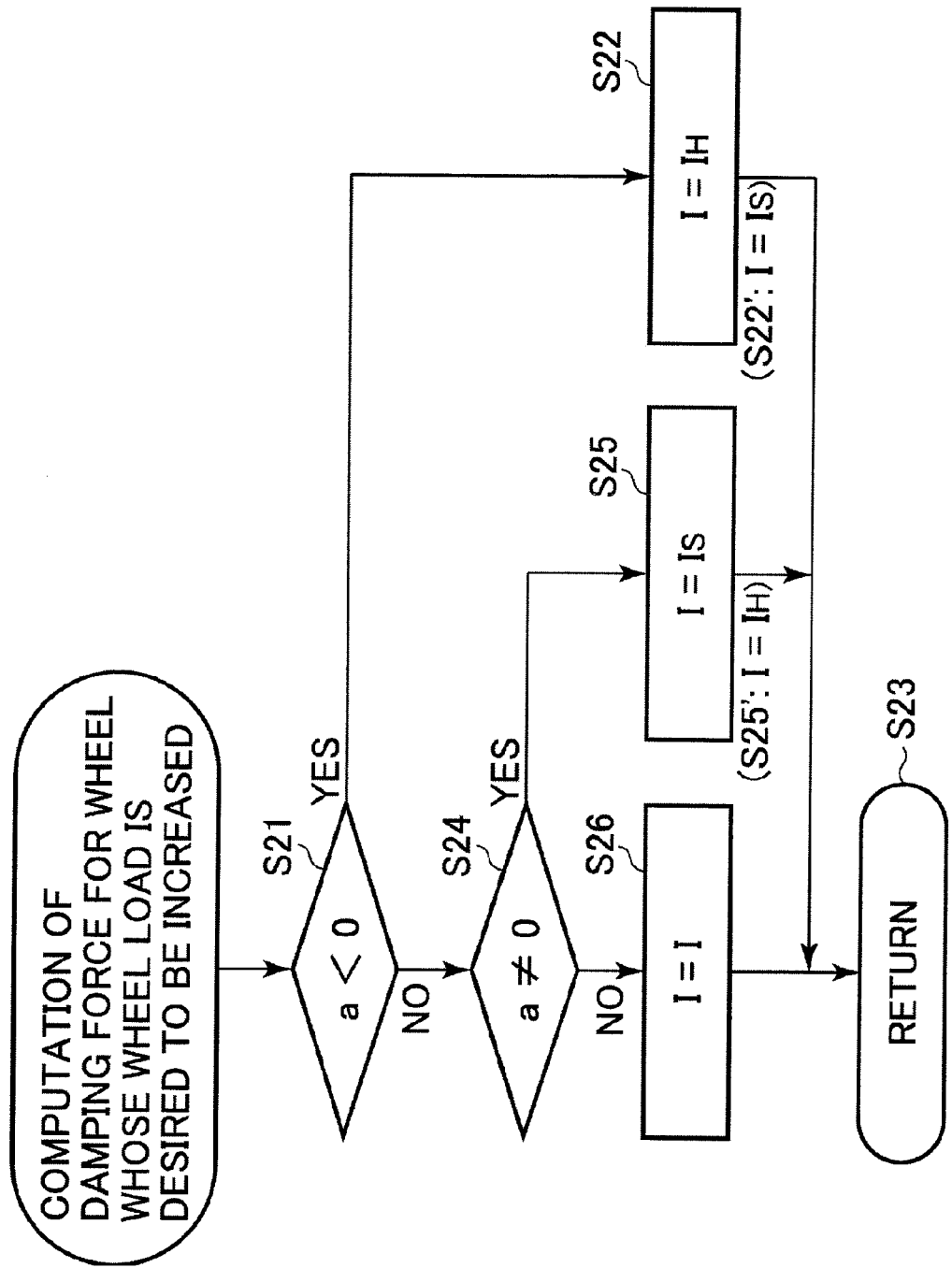
FIG. 5 is a flowchart illustrating damping-force computation processing for the wheel whose wheel load is desired to be increased, which is illustrated in FIG. 4.

The controller 14 includes a storage section 14A including a ROM, a RAM, or a non-volatile memory. A program for control processing illustrated in FIGS. 3 to 5 is stored in the storage section 14A. The controller 14 calculates a damping-force command signal to be output to the actuator (not shown) of each of the damping-force variable dampers 6 and 9 as a current value according to damping-force control processing for each of the wheels, which is illustrated in FIG. 3. The damping force generated from each of the damping-force variable dampers 6 and 9 is variably controlled between the hard characteristic and the soft characteristic in a continuous manner or in a plurality of steps according to the current value (damping-force command signal) supplied to the actuator.

The suspension control apparatus according to this embodiment has the configuration as described above. Next, processing for variably controlling the damping-force characteristic of each of the damping-force variable dampers 6 and 9 by the controller 14 is described.

First, during the running of the vehicle, the controller 14 performs the damping-force control processing for each of the wheels, as illustrated in FIG. 3. Note that, each "Step" is abbreviated as "S" for the description. Specifically, in S1 of FIG. 3, initial setting is performed. In subsequent S2, time management is performed to regulate a control cycle. In S3, the input from the sensors is performed. Specifically, the signals from the sprung acceleration sensors 10, the unsprung acceleration sensors 11, the wheel-cylinder hydraulic-pressure sensors 12A, and the vehicle stability control apparatus 13 are read.

In subsequent S4, the relative acceleration of the damper and the relative velocity of the damper for each of the wheels (for example, see FIGS. 6 to 9) are obtained by computations. In this case, the acceleration signal on the unsprung side, obtained from the sprung acceleration sensor 11, and the acceleration signal on the sprung side, obtained from the sprung acceleration sensor 10, are subjected to the subtraction processing to calculate the relative acceleration of the damper between the sprung side and the unsprung side. By integrating the relative acceleration between the sprung side and the unsprung side, the vertical relative velocity between each of the front wheels 2 and the vehicle body 1, and between each of the rear wheels 3 and the vehicle body 1 is calculated. The relative acceleration and the relative velocity are indicated as being positive on the extension side of the damper and negative on the compression side of the damper is input.

In subsequent S5, the current damping-force command signal. In subsequent S6, a vehicle stability control actuation signal is input from the vehicle stability control apparatus 13. Then, in S7, it is determined whether or not the vehicle stability control is being carried out based on a vehicle stability control actuation state signal.

When it is determined as "YES" in S7, the vehicle stability control is being performed. Therefore, the processing proceeds to subsequent S8 in which the damping-force computation processing for each wheel at the time of actuation of the vehicle stability control illustrated in FIG. 4, which is described below, is executed so as to variably control the wheel load of each wheel (wheel load control). Then, in subsequent S9, the damping-force command signal (target damping-force signal) is output for each wheel to the damping-force variable damper 6 or 9, to thereby variably control the damping force. Then, the processing after S2 is repeated.

On the other hand, when it is determined as "NO" in S7, the vehicle stability control is not being performed. Therefore, the processing proceeds to S10 in which the damping-force computation processing for each wheel at the time of non-actuation of the vehicle stability control is performed as normal control. As the normal control, vibration-damping control such as skyhook control, bad-condition road control during the running on a bad-condition road, roll control, anti-dive control, or anti-squat control is performed. Then, in subsequent S9, the damping-force command signal (target damping-force signal) for each wheel, which is computed in S10, is output so as to variably control the damping force.

In this embodiment, the example where the damping-force computation for the normal control is switched to that for the wheel-load control when the vehicle stability control is performed has been described. However, the switching of the control is not limited thereto. Whether or not the vehicle is present within the range of limit where the vehicle stability control is performed is determined based on a vehicle lateral acceleration or the like so as to switch the control from the normal control to the wheel-load control. Alternatively, by reducing a criterion threshold value in the same logic as that for the actuation of the vehicle stability control, the control may already be switched to the wheel-load control before the vehicle stability control is actuated.

Next, the damping-force computation processing for each wheel at the time of actuation of the vehicle stability control, which is illustrated in FIG. 4, is described. First, in S11, on which wheel side, of the sides of the left and right front wheels 2 and the left and right rear wheels 3, the braking operation is performed is determined according to the detection signals from the wheel-cylinder hydraulic-pressure sensors 12A so as to determine the braked wheel.

In subsequent S12, whether or not the wheel is the braked wheel is determined for each wheel. On the side of the wheel which is determined as "YES", processing in S13 is performed. Specifically, in S13, the computation of the damping force is performed on the side of the wheel whose wheel load is desired to be increased (wheel to be braked). In subsequent S14, the processing returns. On the other hand, on the side of the wheel determined as "NO" in S12, the processing proceeds to S15 in which the computation of the damping force is performed for the wheel whose wheel load is desired to be reduced. Then, in subsequent S14, the processing returns.

In the damping-force computation processing illustrated in FIG. 4, the case where the braked wheel is set to the wheel whose wheel load is desired to be increased so as to improve the braking force has been described as an example. In the case where the control of the present invention is used for other purposes, however, not only the braked wheel or the non-braked wheel but also arbitrary wheels may be set as the wheel whose wheel load is desired to be increased and the wheel whose wheel load is desired to be reduced. Further alternatively, the wheel whose wheel load is desired to be increased and the wheel whose wheel load is desired to be reduced may be set, for example, according to the actuation of an anti-lock brake system.

Next, as the above-mentioned damping-force computation performed in S13 for the wheel whose wheel load is desired to be increased, computation processing illustrated in FIG. 5 is performed. Specifically, in S21 of FIG. 5, whether or not a relative acceleration "a" between the sprung side and the unsprung side is negative (a<0) is determined. In this case, the relative acceleration "a" between the sprung side and the unsprung side is calculated by the processing performed in S4 of FIG. 3.

Then, when it is determined as "YES" (specifically, the relative acceleration "a" is negative) in S21, the processing proceeds to S22 in which a damping-force command signal I is set to a hard command signal $I_H$ so as to increase a rate of increase of the wheel load of the corresponding wheel during the compression stroke and to increase a minimum value during the extension stroke. The hard command signal $I_H$ is a signal for shifting the command signal to the hard side by a predetermined value as compared with the previous damping-force command signal I and therefore does not necessarily denote a two-stage switching signal between the soft side and the hard side. The hard command signal $I_H$ may be changed according to other conditions such as a vehicle velocity. After the processing in S22, the processing returns in subsequent S23.

When it is determined as "NO" in S21, the processing proceeds to S24 in which whether the relative acceleration "a" of the corresponding damper is not zero (a≠0) is determined. When it is determined as "YES" in S24 (specifically, the relative acceleration "a" is positive), the processing proceeds to subsequent S25 in which the damping-force command signal I is set to a soft command signal $I_S$ so as to increase a maximum value of the wheel load of the corresponding wheel during the compression stroke and to reduce a rate of reduction during the extension stroke. The soft command signal $I_S$ is a signal for shifting the command signal to the soft side by a predetermined value as compared with the previous damping-force command signal I and therefore does not necessarily denote a two-state switching signal between the soft side and the hard side. The soft command signal $I_S$ may be changed according to other conditions such as the vehicle velocity. After the processing in S25, the processing returns in subsequent S23.

When it is determined as "NO" (specifically, the relative acceleration "a" is zero) in S24, the processing proceeds to subsequent S26 in which the damping-force command signal I is set to a signal for maintaining the previous damping-force command signal I. In some cases, the relative acceleration "a" vibrates in the vicinity of zero (0) due to the effects of noise and is repeatedly inverted between positive and negative in the processing in S21 and S24. In such a case, the range of value in which the relative acceleration "a" becomes nearly zero is set (for example, the condition in S21 may be set to "a<−|d|" and the condition in S24 may be set to "|d|<a") or the fact that a phase difference between the relative velocity and the relative acceleration is 90 degrees may be used to distinguish the compression stroke and the extension stroke from each other.

Figure 6:
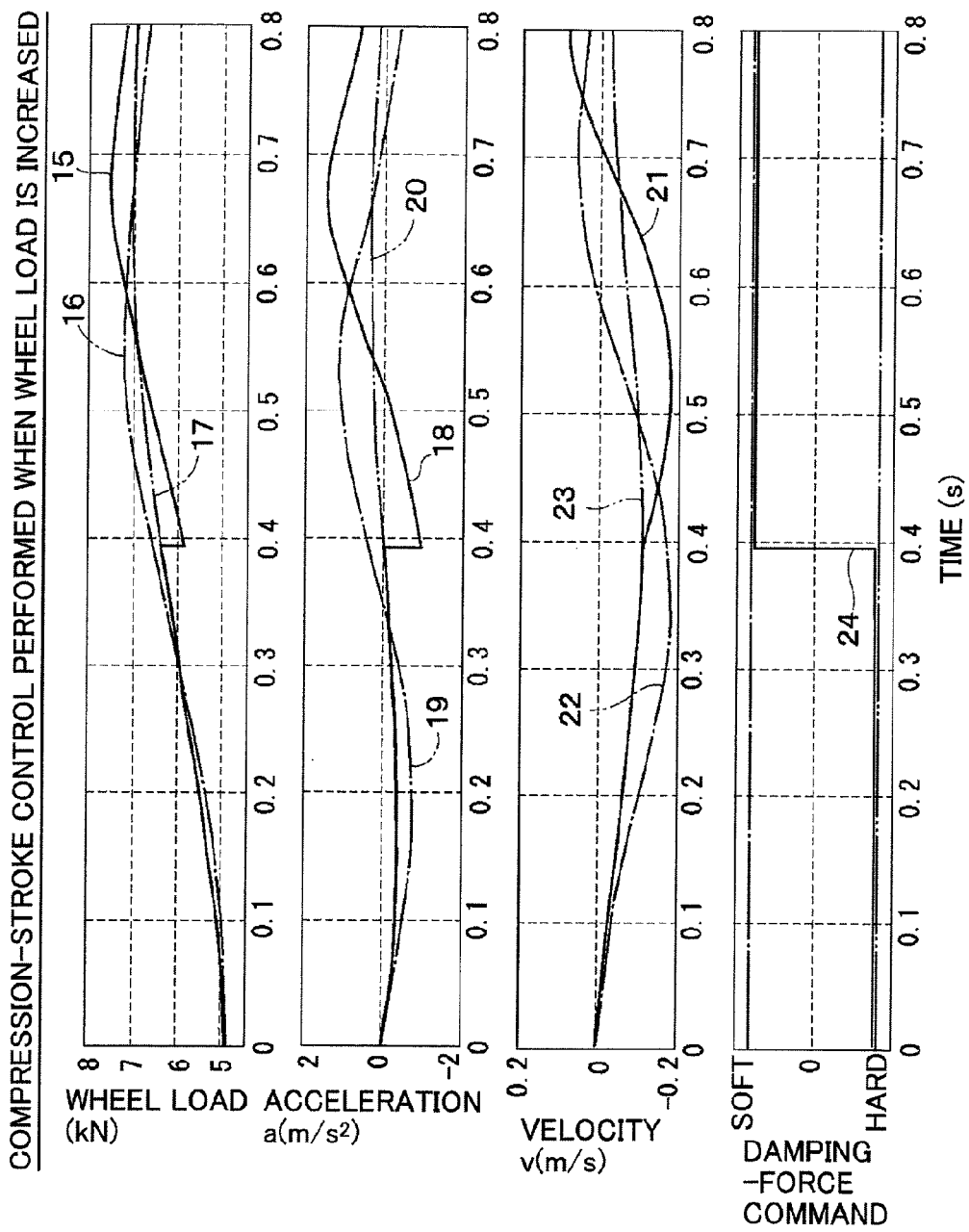
FIG. 6 is a characteristic line diagram of the wheel load, an acceleration, a velocity, and a damping-force command, for showing compression-stroke control performed on the side of the wheel whose wheel load is desired to be increased, in comparison with the case where a damping force is fixed to a hard side and the case where the damping force is fixed to a soft side.
Figure 7:
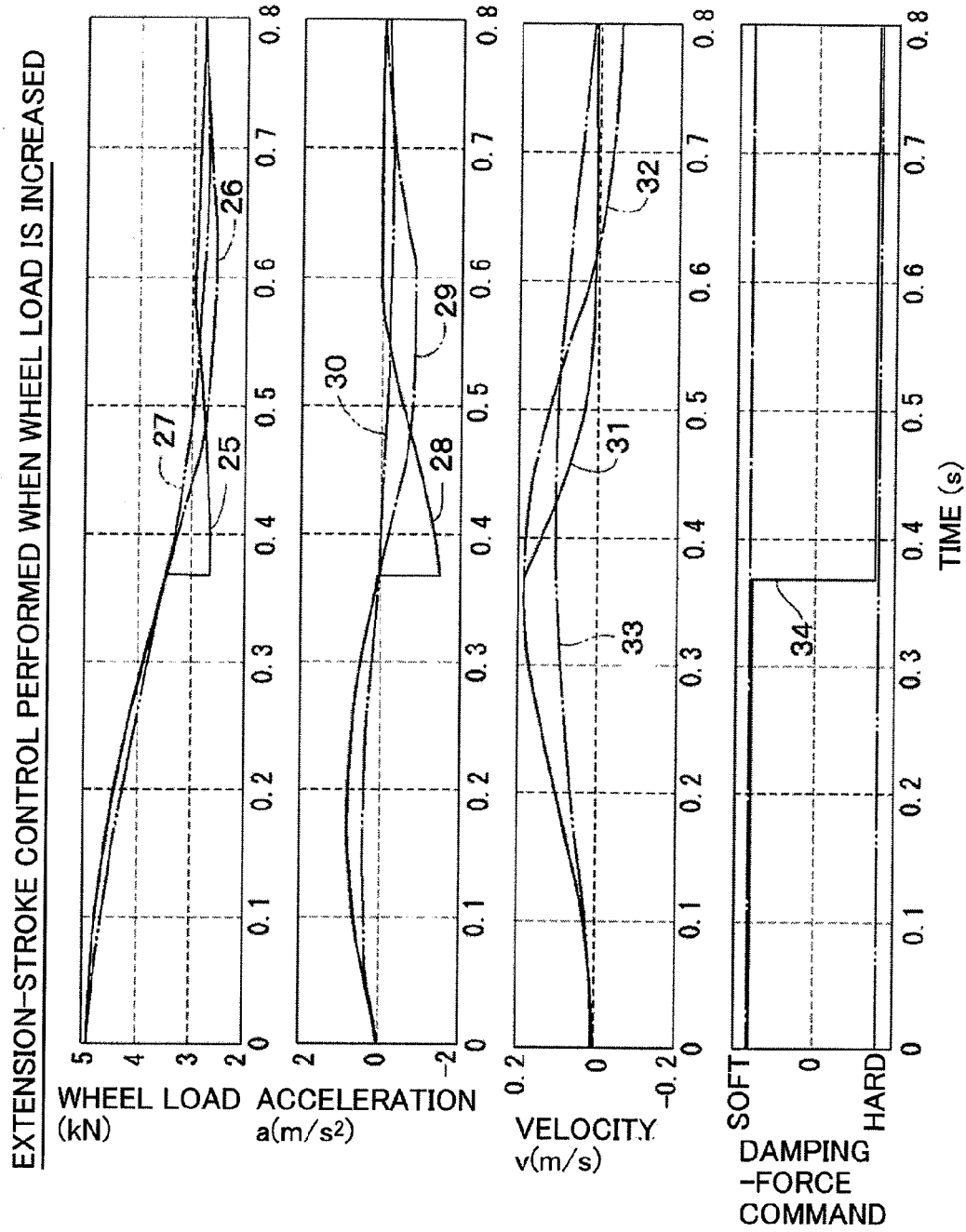
FIG. 7 is a characteristic line diagram of the wheel load, the acceleration, the velocity, and the damping-force command, for showing extension-stroke control performed on the side of the wheel whose wheel load is desired to be increased, in comparison with the case where the damping force is fixed to the hard side and the case where the damping force is fixed to the soft side.

FIGS. 6 and 7 show experimental data during the compression stroke and during the extension stroke, respectively when the damping-force computation processing illustrated in FIG. 5 for the wheel whose wheel load is desired to be increased is used for the suspension control of the vehicle.

In the graphs of FIGS. 6 to 9, FIG. 11, FIG. 12, FIGS. 15 to 18, FIG. 20, and FIG. 22 referred to in each of the embodiments described below, a solid line represents a characteristic of each corresponding embodiment, and a long dashed short dashed line represents a characteristic of the case where the damping force is fixed to the soft side, and a long dashed double-short dashed line represents a characteristic of the case where the damping force is fixed to the hard side. Each of the graphs in the figures shows the transitions of the wheel load, the relative acceleration, the relative velocity, and the damping-force command signal with elapse of time in this order from the upper side.

When the damping force on the side of the wheel whose wheel load is desired to be increased is fixed to the hard side, a value of the relative acceleration becomes negative as indicated by a characteristic line 20 shown in FIG. 6, for example, during a period of time between 0 seconds and about 0.39 seconds. Therefore, during this period of time, the damping-force command signal I is set to the hard command signal $I_H$ by the processing performed in S21 and S22 of FIG. 5 so as to increase the wheel load of the corresponding wheel during the compression stroke. Thus, a characteristic of the wheel load in the first embodiment is set to the same characteristic (characteristic in which the wheel load starts increasing earlier than in the case where the damping-force is fixed to the soft side) as the wheel-load characteristic (indicated by a characteristic line 17 shown in a long dashed double-short dashed line) in the case where the damping force is fixed to the hard side, for example, during the period of time between 0 seconds and about 0.39 seconds as indicated by a characteristic line 15 shown in a solid line.

Then, after about 0.39 seconds shown in FIG. 6, the value of the relative acceleration changes from negative to positive through zero (the relative velocity has a minimum value, specifically, becomes maximum in a negative direction during the compression stroke, as indicated by a characteristic line 23 shown in a long dashed double-short dashed line) as indicated by a characteristic line 20 shown in a long dashed double-short dashed line. Then, by the processing in S21, S24, and S25 of FIG. 5, the damping-force command signal I is set to the soft command signal $I_S$ so that the damping force for the corresponding wheel becomes soft. As a result, as indicated by the characteristic line 15 shown in the solid line, the characteristic of the wheel load according to the first embodiment is kept smaller than the characteristic line 16 in the case where the damping force is fixed to the soft side and the characteristic line 17 in the case where the damping force is fixed to the hard side, during the period of time between, for example, about 0.39 seconds and 0.55 seconds.

After, for example, 0.55 seconds, however, the wheel load (characteristic line 15) according to the first embodiment becomes larger than the wheel load indicated by the characteristic line 17 in the case where the damping force is fixed to the hard side. For example, during a period of time between 0.59 seconds and 0.8 seconds, the wheel-load characteristic according to the first embodiment becomes larger than the wheel-load characteristic indicated by the characteristic line 16 in the case where the damping-force characteristic is fixed to the soft side and the characteristic line 17 in the case where the damping-force characteristic is fixed to the hard side, as indicated by the characteristic line 15. Then, the wheel load according to the first embodiment is increased to the maximum value as large as, for example, 7.5 (kN) during a period of time between about 0.67 seconds and 0.7 seconds.

Therefore, according to the first embodiment, during the compression stroke on the side of the wheel whose wheel load is desired to be increased, the damping-force command is set to the hard side (the damping-force command signal I is set to the hard command signal $I_H$) in an early stage (for example, during the period of time between 0 seconds and 0.39 seconds) and is then switched to the soft side (the damping-force command signal I is set to the soft command signal $I_S$) in a latter stage (for example, during the period of time between 0.39 and 0.8 seconds) as indicated by the characteristic line 24 shown in a solid line in FIG. 6. As a result, during the compression stroke on the side of the wheel whose wheel load is desired to be increased, the wheel load can be quickly raised to improve responsiveness as indicated by the characteristic line 15. At the same time, the maximum value of the wheel load can be increased to about, for example, 7.5 (kN).

Next, FIG. 7 shows experimental data during the extension stroke in the case where the damping-force computation processing for the wheel whose wheel load is desired to be increased, which is illustrated in FIG. 5, is used for the suspension control of the vehicle.

When the damping force of the extension stroke on the side of the wheel whose wheel load is desired to be increased is fixed to the soft side, a value of the relative acceleration becomes positive as indicated by a characteristic line 29 shown in FIG. 7, for example, during a period of time between 0 seconds and about 0.37 seconds. Therefore, during this period of time, the damping-force command signal I is set to the soft command signal $I_s$ by the processing performed in S21, S24, and S25 of FIG. 5 so that the damping force for the corresponding wheel becomes softer. Thus, a characteristic of the wheel load in the first embodiment is set to the same characteristic (characteristic in which the wheel load more slowly reduces than that in the case where the damping force is fixed to the hard side) as the wheel-load characteristic (indicated by a characteristic line 26 shown in a long dashed short dashed line) in the case where the damping force is fixed to the soft side, for example, during the period of time between 0 seconds and about 0.37 seconds as indicated by a characteristic line 25 shown in a solid line.

Then, after about 0.37 seconds shown in FIG. 7, the value of the relative acceleration changes from positive to negative through zero (the relative velocity becomes maximum as indicated by a characteristic line 32 shown in a long dashed short dashed line) as indicated by a characteristic line 29 shown in a long dashed short dashed line. Then, by the processing in S21, and S22 of FIG. 5, the damping-force command signal I is set to the hard command signal $I_H$ so that the damping force for the corresponding wheel becomes harder. As a result, as indicated by the characteristic line 25 shown in the solid line, the characteristic of the wheel load according to the first embodiment is kept smaller than the characteristic line 26 in the case where the damping force is fixed to the soft side and the characteristic line 27 in the case where the damping force is fixed to the hard side, during the period of time between, for example, about 0.37 seconds and 0.48 seconds.

After, for example, 0.48 seconds, however, the wheel load according to the first embodiment as indicated by the characteristic line 25 becomes larger than the wheel load indicated by the characteristic line 26 in the case where the damping force is fixed to the soft side. For example, during a period of time between 0.55 seconds and 0.8 seconds, the wheel-load characteristic according to the first embodiment as indicated by the characteristic line 25 becomes larger than the wheel-load characteristic indicated by the characteristic line 26 in the case where the damping-force characteristic is fixed to the soft side and the characteristic line 27 in the case where the damping-force characteristic is fixed to the hard side. Then, the wheel load according to the first embodiment is reduced to, for example, 2.6 to 2.7 (kN) during a period of time between about 0.37 seconds and 0.4 seconds, and is increased to, for example, 2.9 (kN) or more during a period of time between about 0.57 seconds and 0.6 seconds.

Therefore, according to the first embodiment, on the side of the wheel whose wheel load is desired to be increased, the damping-force command is set to the soft side (the damping-force command signal I is set to the soft command signal $I_S$) in the early stage (for example, during the period of time between 0 seconds and 0.37 seconds) and is then switched to the hard side (the damping-force command signal I is set to the hard command signal $I_H$) in the latter stage (for example, during the period of time between 0.37 seconds and 0.8 seconds) as indicated by the characteristic line 34 shown in a solid line in FIG. 7. As a result, responsiveness (wheel-load loss) to reduce the wheel load on the side of the wheel whose wheel load is desired to be increased can be lowered as indicated by the characteristic line 25. At the same time, the maximum amount of the wheel-load loss (the minimum value of the wheel load) can be smaller than that in the case where the damping force is fixed to the soft side (indicated by the characteristic line 26).

The computation of the damping force for the wheel whose wheel load is desired to be reduced, which is performed in S15 described above, is substantially the same as the computation of the damping force illustrated in FIG. 5, which is performed for the wheel whose wheel load is desired to be increased. Accordingly, only differences between the above-mentioned damping-force computations are described referring to FIG. 5.

In the computation of the damping force for the wheel whose wheel load is desired to be reduced, S22 of FIG. 5 is replaced by S22', and a computation for setting the damping-force command signal I to the soft command signal $I_S$ (computation performed in S25 of FIG. 5) is performed in S22'. Further, S25 of FIG. 5 is replaced by S25', and a computation for setting the damping-force command signal I to the hard command signal $I_H$ (computation performed in S22 of FIG. 5) is performed in S25'.

Figure 8:
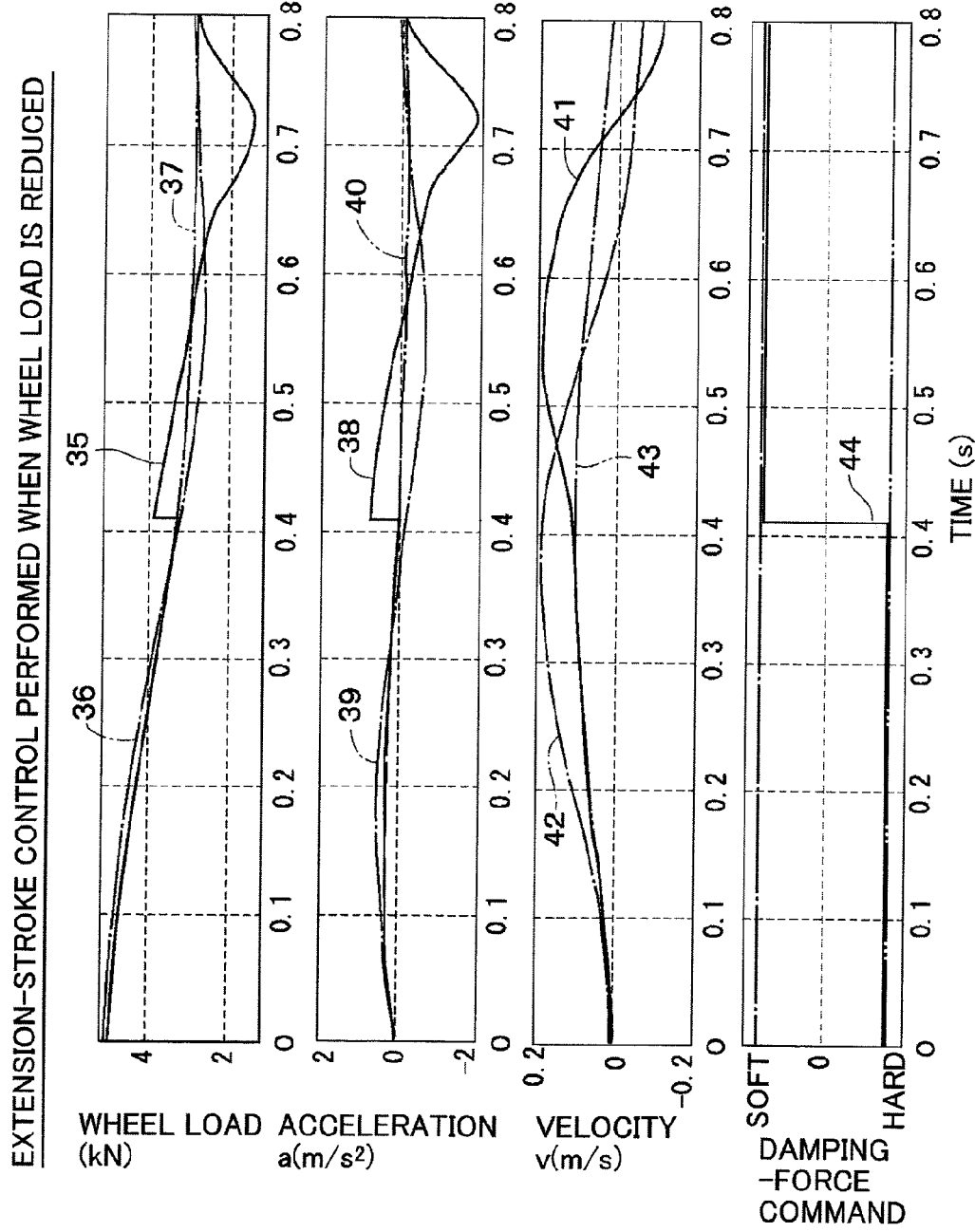
FIG. 8 is a characteristic line diagram of the wheel load, the acceleration, the velocity, and the damping-force command, for showing the extension-stroke control performed on the side of the wheel whose wheel load is desired to be reduced, in comparison with the case where the damping force is fixed to the hard side and the case where the damping force is fixed to the soft side.
Figure 9:
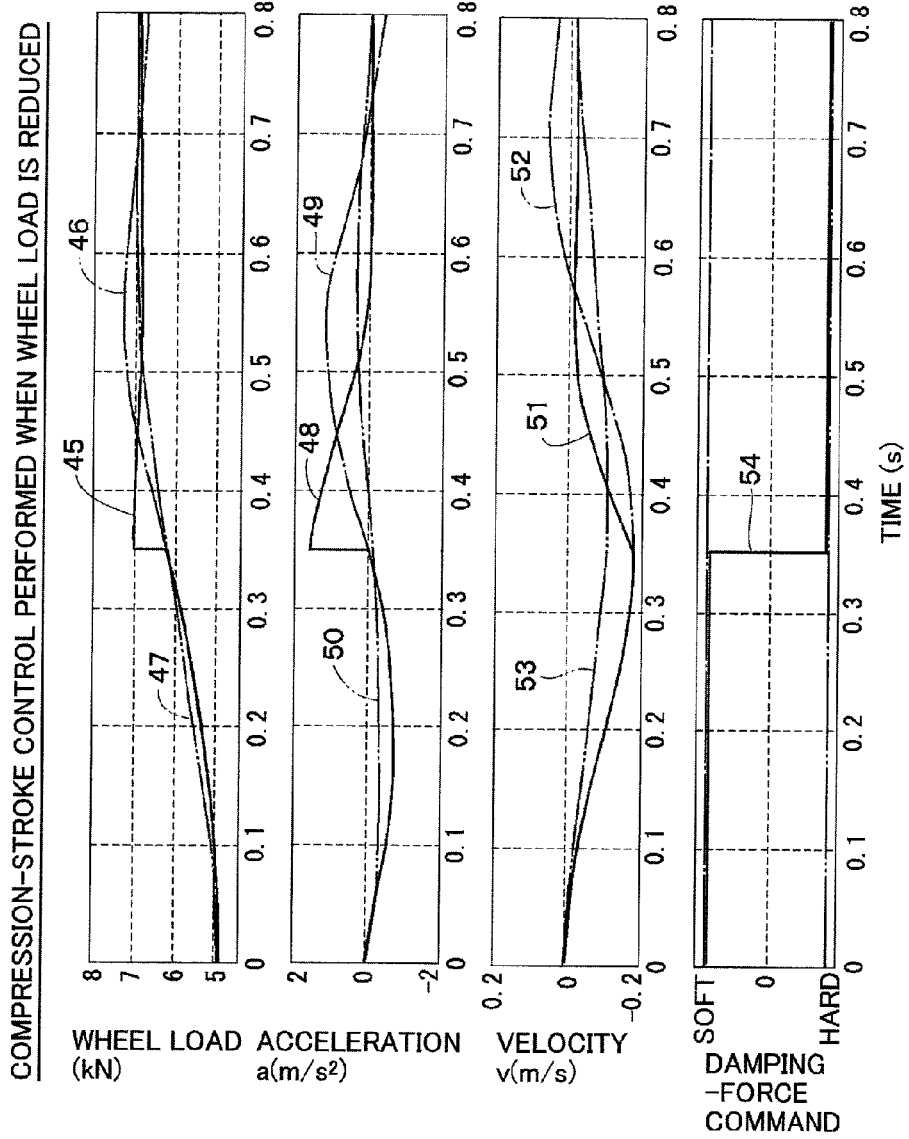
FIG. 9 is a characteristic line diagram of the wheel load, the acceleration, the velocity, and the damping-force command, for showing the compression-stroke control performed on the side of the wheel whose wheel load is desired to be reduced, in comparison with the case where the damping force is fixed to the hard side and the case where the damping force is fixed to the soft side.

FIGS. 8 and 9 show experimental data during the extension stroke and during the compensation stroke, respectively, in the case where the damping-force computation processing for the wheel whose wheel load is desired to be reduced is used for the suspension control of the vehicle.

When the damping force on the side of the wheel whose wheel load is desired to be reduced is fixed to the hard side during the extension stroke, a value of the relative acceleration becomes positive as indicated by a characteristic line 40 shown in FIG. 8, for example, during a period of time between 0 seconds and about 0.41 seconds. Therefore, during this period of time, the damping-force command signal I is set to the hard command signal $I_H$ by the processing performed in S21, S24, and S25' of FIG. 5 so as to reduce the wheel load of the corresponding wheel during the extension stroke. Thus, as indicated by a characteristic line 35 shown in a solid line, a characteristic of the wheel load in the first embodiment is set to the same characteristic as the wheel-load characteristic (indicated by a characteristic line 37 shown in a long dashed double-short dashed line) in the case where the damping force is fixed to the hard side, for example, during the period of time between 0 seconds and about 0.41 seconds.

Then, after about 0.41 seconds shown in FIG. 8, the value of the relative acceleration changes from positive to negative through zero as indicated by the characteristic line 40 shown in a long dashed double-short dashed line (the relative velocity becomes maximum as indicated by a characteristic line 43 shown in a long dashed double-short dashed line). Then, by the processing in S21 and S22' of FIG. 5, the damping-force command signal I is set to the soft command signal $I_S$ so that the damping force for the corresponding wheel becomes soft during the extension stroke. As a result, as indicated by the characteristic line 35 shown in the solid line, the characteristic of the wheel load according to the first embodiment is kept larger than a characteristic line 36 in the case where the damping force is fixed to the soft side and the characteristic line 37 in the case where the damping force is fixed to the hard side, during the period of time between, for example, about 0.41 seconds and 0.56 seconds.

After, for example, 0.56 seconds, however, as indicated by the characteristic line 35, the wheel load according to the first embodiment becomes smaller than the wheel load indicated by the characteristic line 37 in the case where the damping force is fixed to the hard side. For example, during a period of time between 0.62 seconds and 0.8 seconds, as indicated by the characteristic line 35, the wheel-load characteristic according to the first embodiment becomes smaller than the wheel-load characteristic indicated by the characteristic line 36 in the case where the damping-force characteristic is fixed to the soft side and the characteristic line 37 in the case where the damping-force characteristic is fixed to the hard side. Then, the wheel load according to the first embodiment is reduced to the minimum value as small as, for example, 1.5 (kN) or less during a period of time between about 0.71 seconds and 0.73 seconds.

Therefore, according to the first embodiment, during the extension stroke on the side of the wheel whose wheel load is desired to be reduced, the damping-force command is set to the hard side (the damping-force command signal I is set to the hard command signal $I_H$) in an early stage (for example, during the period of time between 0 seconds and 0.41 seconds) and is then switched to the soft side (the damping-force command signal I is set to the soft command signal $I_S$) in a latter stage (for example, during the period of time between 0.41 seconds and 0.8 seconds) as indicated by a characteristic line 44 shown in a solid line in FIG. 8. As a result, on the side of the wheel whose wheel load is desired to be reduced, the wheel load can be quickly reduced to improve responsiveness of the wheel-load loss as indicated by the characteristic line 35. At the same time, the wheel-load loss is reduced to the minimum value as small as, for example, 1.5 (kN) or less. Therefore, the maximum value of the wheel-load loss can be increased.

When the damping force on the side of the wheel whose wheel load is desired to be reduced is fixed to the soft side during the compression stroke, a value of the relative acceleration becomes negative as indicated by a characteristic line 50 shown in FIG. 9, for example, during a period of time between 0 seconds and about 0.35 seconds. Therefore, during this period of time, the damping-force command signal I is set to the soft command signal $I_S$ by the processing performed in S21 and S22' of FIG. 5 so that the damping force for the corresponding wheel becomes softer. Thus, as indicated by a characteristic line 45 shown in a solid line, a characteristic of the wheel load in the first embodiment is set to the same characteristic as the wheel-load characteristic (indicated by a characteristic line 46 shown in a long dashed short dashed line) in the case where the damping force is fixed to the soft side, for example, during the period of time between 0 seconds and about 0.35 seconds.

Then, after about 0.35 seconds shown in FIG. 9, as indicated by a characteristic line 49 shown in a long dashed short dashed line, the value of the relative acceleration changes from negative to positive through zero (the relative velocity has a minimum value, specifically, becomes maximum in a negative direction during the compression stroke, as indicated by a characteristic line 52 shown in a long dashed short dashed line). Then, by the processing in S21, S24, and S25' of FIG. 5, the damping-force command signal I is set to the hard command signal $I_H$ so that the damping force for the corresponding wheel becomes harder. As a result, as indicated by the characteristic line 45 shown in the solid line, the characteristic of the wheel load according to the first embodiment is kept larger than the characteristic indicated by the characteristic line 46 in the case where the damping force is fixed to the soft side and a characteristic line 47 in the case where the damping force is fixed to the hard side, during the period of time between, for example, about 0.35 seconds and 0.45 seconds.

However, for example, during a period of time between about 0.45 seconds and 0.71 seconds, however, as indicated by the characteristic line 45 the wheel load according to the first embodiment becomes smaller than the wheel load indicated by the characteristic line 46 in the case where the damping force is fixed to the soft side. For example, during a period of time between 0.51 seconds and 0.8 seconds, as indicated by the characteristic line 45, the wheel-load characteristic according to the first embodiment becomes smaller than the wheel-load characteristic indicated by the characteristic line 47 in the case where the damping-force characteristic is fixed to the hard side. The wheel load according to the first embodiment is increased to, for example, about 7 (kN) during the period of time between about 0.35 seconds and 0.4 seconds and is reduced to, for example, about 6.8 (kN) during the period of time between about 0.52 seconds and 0.6 seconds.

Therefore, according to the first embodiment, on the side of the wheel whose wheel load is desired to be reduced, the damping-force command is set to the soft side (the damping-force command signal I is set to the soft command signal $I_S$) in the early stage (for example, during the period of time between 0 seconds and about 0.35 seconds) and is switched to the hard side (the damping-force command signal I is set to the hard command signal $I_H$) in the latter stage (for example, during the period of time between 0.35 seconds and 0.8 seconds) as indicated by a characteristic line 54 shown in a solid line in FIG. 9. As a result, the responsiveness to increase the wheel load on the side of the wheel whose wheel load is desired to be reduced can be lowered as indicated by a characteristic line 45. At the same time, a maximum amount of increase in wheel load (maximum value of the wheel load) can be kept small as compared with the case where the damping force is fixed to the soft side (indicated by a characteristic line 46).

As described above, according to the first embodiment, by using the configuration described above, the wheel load can be quickly raised while the maximum amount of increase in wheel load can be increased for the wheel whose load is desired to be increased during the compression stroke of each of the damping-force variable dampers 6 (9), as indicated by the characteristic line 15 illustrated in FIG. 6. The speed of losing the wheel load can be made lower while the maximum amount of loss in wheel load can be reduced during the extension stroke of each of the damping-force variable dampers 6 (9), as indicated by the characteristic line 25 illustrated in FIG. 7.

On the other hand, for the wheel whose wheel load is desired to be reduced, the wheel load can be lost rapidly while the maximum amount of the wheel-load loss can be increased during the extension stroke of each of the damping-force variable dampers 6 (9), as indicated by the characteristic line 35 shown in FIG. 8. During the compression stroke of each of the damping-force variable dampers 6 (9), the speed of increasing the wheel load can be made lower while the maximum amount of increase in wheel load can be kept small, as indicated by the characteristic line 45 shown in FIG. 9.

Therefore, for the wheel load during one of the extension stroke and the compression stroke of each of the damping-force variable dampers 6 (9), the responsiveness to increase or lose the wheel load and the maximum amount (absolute amount) of increase or loss of the wheel load can be both improved. Also, when the responsiveness is to be lowered, the maximum amount (absolute amount) can also be reduced. As a result, the operation of the vehicle can be more safely controlled.

Next, FIGS. 10 to 14 illustrate a second embodiment of the present invention. The second embodiment is characterized in that the damping-force characteristic of the shock absorber (damper) is continuously and smoothly switched between the hard side and the soft side so as to smoothly perform the control for increasing the wheel load and the control for reducing the wheel load. There are some methods for performing the smooth switching between the two types of control. In the second embodiment, the switching is started at the time of inversion of the sign of the acceleration. Then, within a predetermined period of time, the gradual switching from one type of control to the other type of control is performed. In the second embodiment, the same components as those of the first embodiment described above are denoted by the same reference symbols, and the description thereof is herein omitted.

Figure 10:
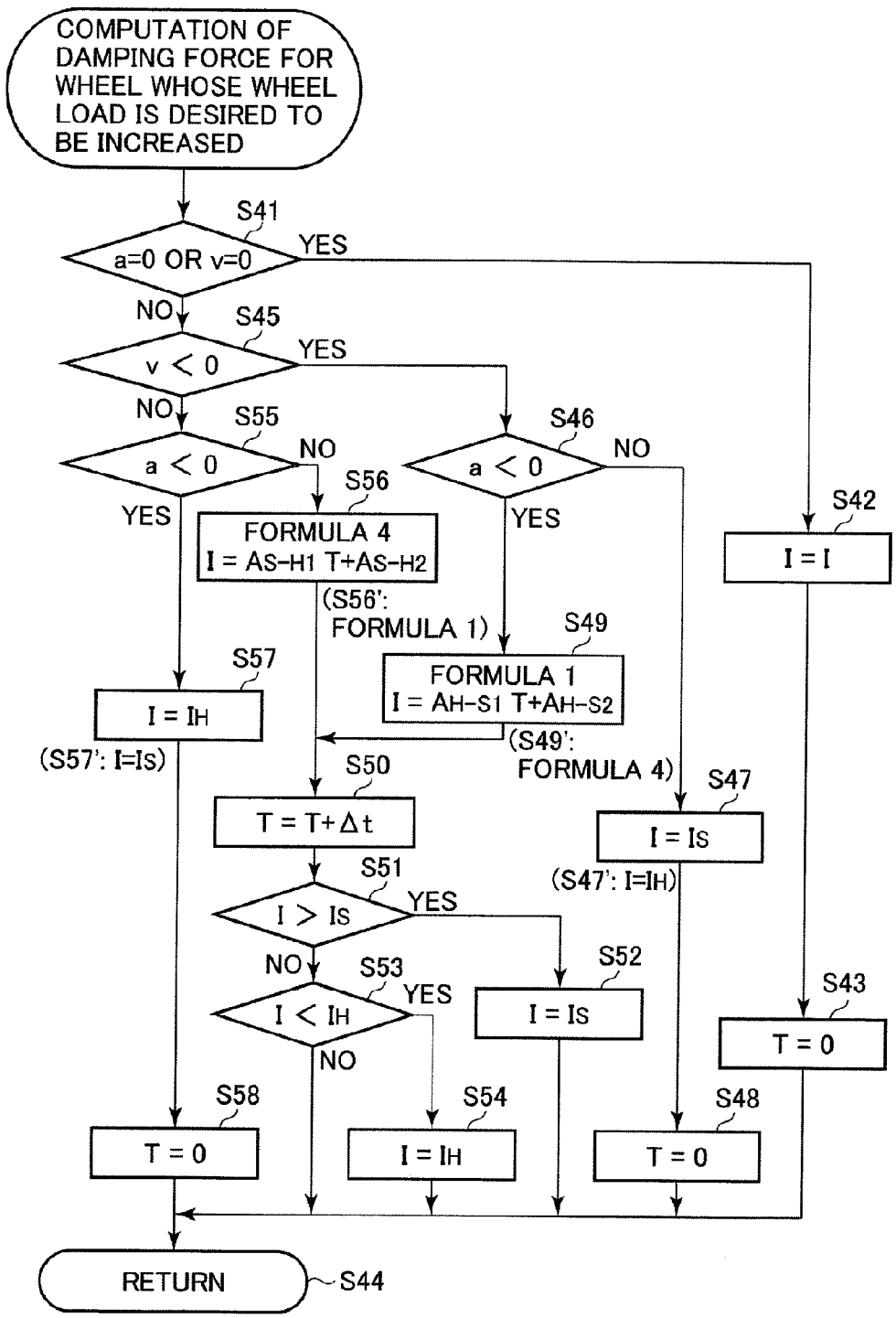
FIG. 10 is a flowchart illustrating damping-force computation processing in the case where the damping force for the wheel whose wheel load is desired to be increased is smoothly switched, according to a second embodiment.

FIG. 10 illustrates the damping-force computation processing for the wheel whose wheel load is desired to be increased. The damping-force computation processing is realized by embodying, for example, the computation of the damping force for the wheel whose wheel load is desired to be increased, which is performed in S13 of FIG. 4, in the case where the damping force is smoothly switched. Specifically, in S41 of FIG. 10, whether or not the relative acceleration "a" between the sprung side and the unsprung side is zero (a=0) or whether or not a relative velocity "v" between the sprung side and the unsprung side is zero (v=0) is determined.

Then, when it is determined as "YES" in S41, the relative acceleration "a" of the damping-force variable damper 6 or 9 becomes zero (a=0) or the relative velocity "v" becomes zero (v=0) for the corresponding wheel (any one of the right and left front wheels 2 and the right and left rear wheels 3). Therefore, the processing proceeds to subsequent S42 in which the damping-force command signal I is set to a signal for maintaining the previous damping-force command signal I. In subsequent S43, a timer T for setting a damping-force switching time is reset to zero (T=0). Then, the processing returns in subsequent S44.

Even in the above-mentioned processing performed in S41, S46, and S55, the relative acceleration "a" sometimes vibrates in the vicinity of zero (0) due to the effects of noise to be repeatedly inverted between positive and negative. Therefore, the range of value in which the relative acceleration "a" becomes nearly zero may be set or the fact that the phase difference between the relative velocity and the relative acceleration is 90 degrees may be used so as to distinguish the compression stroke and the extension stroke from each other. This is also applied to the relative velocity "v".

Next, in S45, whether or not the relative velocity "v" is negative (v<0) is determined. In this case, the relative velocity "v" between the sprung side and the unsprung side is calculated by the processing performed in S4 of FIG. 3. When it is determined as "YES" in S45, the processing proceeds to subsequent S46 in which whether or not the relative acceleration "a" is negative (a<0) is determined. When it is determined as "NO" in S46, the processing proceeds to subsequent S47 in which the damping-force command signal I is set to the soft command signal $I_S$ so as to increase the wheel load of the corresponding wheel during the compression stroke. In subsequent S48, the timer T is reset to zero (T=0). Then, in subsequent S44, the processing returns.

When it is determined as "YES" in S46, the processing proceeds to subsequent S49 in which the damping-force command signal I is computed so as to satisfy the following Formula 1.

$$I = A_{H\text{-}S1} \times T + A_{H\text{-}S2} \qquad \text{[Formula 1]}$$

$$A_{H\text{-}S1} = (I_S - I_H)/T_{H\text{-}S} \qquad \text{[Formula 2]}$$

$$A_{H\text{-}S2} = I_H \qquad \text{[Formula 3]}$$

A factor $A_{H\text{-}S1}$ is a constant determined by Formula 2 described above and is obtained as a positive factor with the hard command signal $I_H$, the soft command signal $I_S$ ($I_S > I_H$), and a time ($T_{H\text{-}S}$) which is a constant. Then, the damping-force command signal I is computed as a signal increasing from the predetermined hard command signal $I_H$ (see Formula 3 described above) in proportion to the time (damping-force switching time) indicated by the timer T by the factor $A_{H\text{-}S1}$.

In subsequent S50, the time (damping-force switching time) indicated by the timer T is set to: T=T+Δt so that the time is increased by a predetermined sampling time Δt, which is previously determined for each program cycle. In subsequent S51, whether or not the damping-force command signal I set in S49 described above is larger than the soft command signal $I_S$ (I>$I_S$) is determined. When it is determined as "YES" in S51, the processing proceeds to subsequent S52 in which the damping-force command signal I set to the soft command signal $I_S$.

When it is determined as "NO" in S51, it can be determined that the damping-force command signal I is smaller than the soft command signal $I_S$. Therefore, the processing proceeds to subsequent S53 in which whether or not the value of the damping-force command signal I is smaller than that of the hard command signal $I_H$ (I<$I_H$) is determined. When it is determined as "YES" in S53, the processing proceeds to subsequent S54 in which the damping-force command signal I is set to the hard command signal $I_H$.

As long as it is determined as "NO" in S53, the damping-force command signal I set in S49 and S50 is larger than the hard command signal $I_H$ and smaller than the soft command signal $I_S$. In this case, the damping-force command signal I calculated by Formula 1 described above is output as a damping-force command indicated by a characteristic line 70 shown in FIG. 11.

On the other hand, when it is determined as "NO" in S45, the processing proceeds to subsequent S55 in which whether or not the relative acceleration "a" is negative (a<0) is determined. When it is determined as "NO" in S55, the processing proceeds to subsequent S56 in which the damping-force command signal I is computed so as to satisfy the following Formula 4.

$$I = A_{S\text{-}H1} \times T + A_{S\text{-}H2} \qquad \text{[Formula 4]}$$

$$A_{S\text{-}H1} = (I_H - I_S)/T_{S\text{-}H} \qquad \text{[Formula 5]}$$

$$A_{S\text{-}H2} = I_S \qquad \text{[Formula 6]}$$

A factor $A_{S\text{-}H1}$ is a constant determined by Formula 5 described above and is obtained as a negative factor with the hard command signal $I_H$, the soft command signal $I_S$ ($I_S > I_H$), and a time ($T_{S\text{-}H}$) which is a constant. Then, the damping-force command signal I is computed as a signal reducing from the predetermined soft command signal $I_S$ (see Formula 6 described above) in proportion to the time (damping-force switching time) indicated by the timer T by the factor $A_{S-H1}$. After that, the processing in S50 to S54 is performed.

When it is determined as "YES" in S55, the processing proceeds to subsequent S57 in which the damping-force command signal I is set to the hard command signal $I_H$ so as to increase the wheel load of the corresponding wheel. Then, in subsequent S58, the timer T is reset to zero (T=0). After that, in S44, the processing returns.

Figure 11:
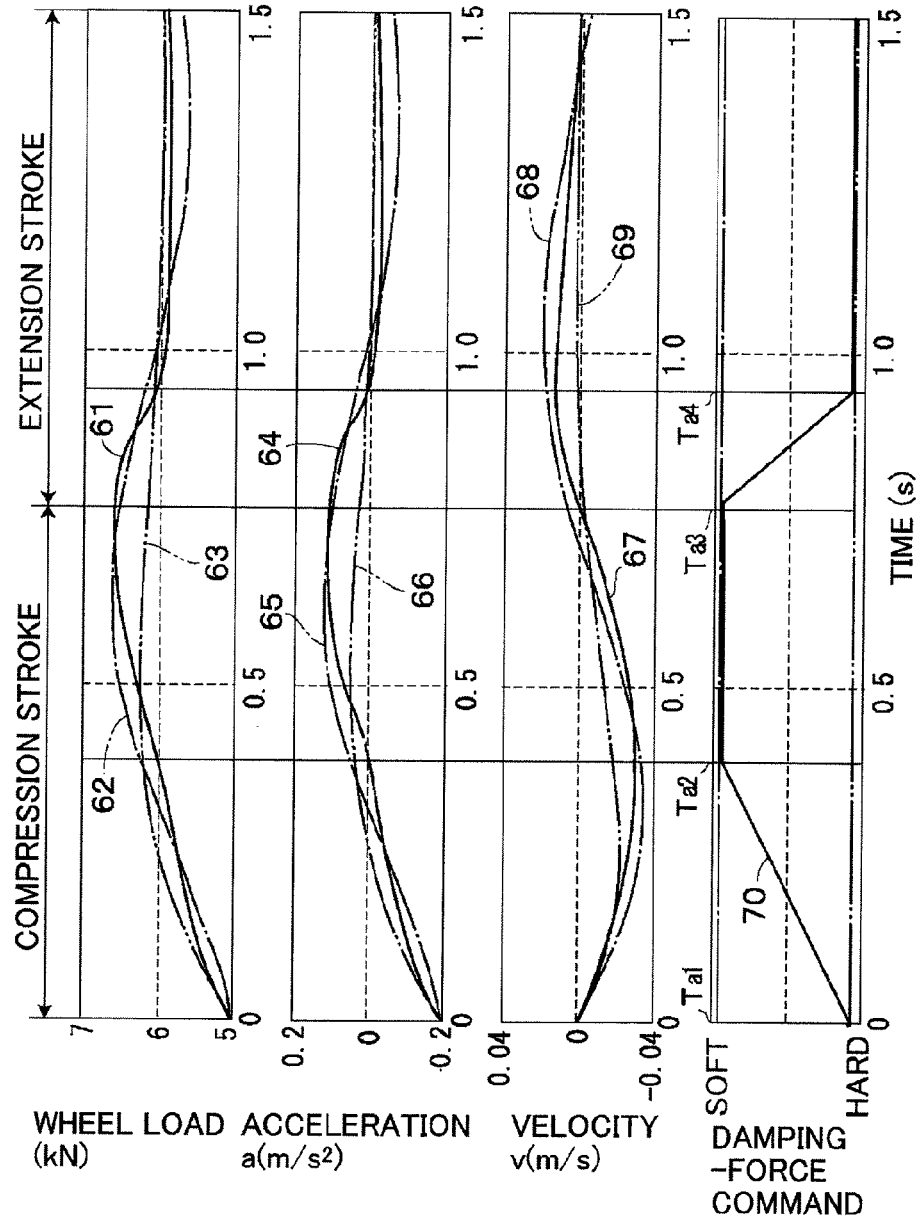
FIG. 11 is a characteristic line diagram of the wheel load, the acceleration, the velocity, and the damping-force command, for showing control during the extension stroke and the compression stroke on the side of the wheel whose wheel load is desired to be increased, in comparison with the case where the damping force is fixed to the hard side and the case where the damping force is fixed to the soft side.

FIG. 11 shows data in the case where the control is performed on the wheel whose wheel load is desired to be increased.

During a period of time between Ta1 and Ta2, the relative velocity has a negative value and the relative acceleration also has a negative value. Therefore, during the period of time between Ta1 and Ta2, the control for gradually increasing the damping-force command signal I from the hard command signal $I_H$ to the soft command signal $I_S$ is performed by the processing performed in S41, S45, S46, and S49 of FIG. 10.

During a period of time between Ta2 and Ta3, the relative velocity has a negative value, whereas the relative acceleration has a positive value. Then, by the processing performed in S46 and S47 of FIG. 10, the damping-force is set so as to be on the soft side.

During a period of time between Ta3 and Ta4, the relative velocity has a positive value and the relative acceleration also has a positive value. Therefore, the control for gradually reducing the damping-force command signal I from the soft command signal $I_S$ to the hard command signal $I_H$ is performed by the processing performed in S45, S55, and S56 of FIG. 10.

In addition, after time Ta4, the relative velocity has a positive value, whereas the relative acceleration has a negative value. Then, by the processing performed in S55 and S57 of FIG. 10, the damping-force is set so as to be on the hard side.

Next, the damping-force computation processing for the wheel whose wheel load is desired to be reduced according to the second embodiment, which is performed in S15 of FIG. 4, is described. The damping-force computation processing for the wheel whose wheel load is desired to be reduced is approximately the same as the damping-force computation processing for the wheel whose wheel load is desired to be increased. Therefore, only differences therebetween are described referring to FIG. 10.

In the computation of the damping force for the wheel whose wheel load is desired to be reduced, S47 of FIG. 10 is replaced by S47', and a computation (computation performed in S57 of FIG. 10) for setting the damping-force command signal I to the hard command signal $I_H$ is performed in S47'. In S49', S49 of FIG. 10 is replaced by S49', and the damping-force command signal I is computed (computation in S56 of FIG. 10 is performed) so as to satisfy Formula 4. In S56', S56 of FIG. 10 is replaced by S56', and the damping-force command signal I is computed (computation in S49 of FIG. 10 is performed) so as to satisfy Formula 1. Further, in S57', S57 of FIG. 10 is replaced by S57', and a computation (computation performed in S47 of FIG. 10) for setting the damping-force command signal I to the soft command signal $I_S$ is performed.

Figure 12:
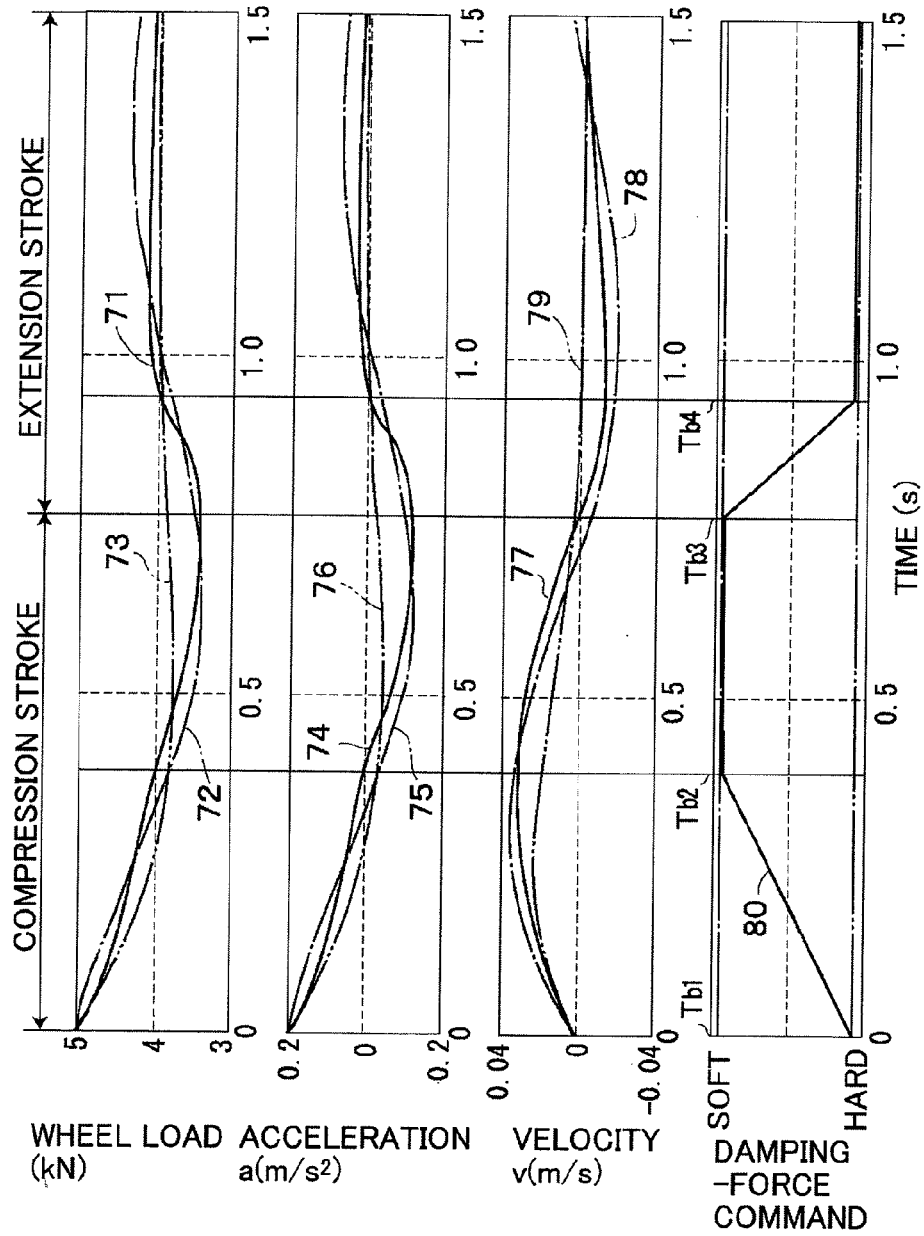
FIG. 12 is a characteristic line diagram of the wheel load, the acceleration, the velocity, and the damping-force command, for showing control during the extension stroke and the compression stroke on the side of the wheel whose wheel load is desired to be reduced during the extension stroke and the compression stroke, in comparison with the case where the damping force is fixed to the hard side and the case where the damping force is fixed to the soft side.

FIG. 12 shows data in the case where the control is performed on the wheel whose wheel load is desired to be reduced.

During a period of time between Tb1 and Tb2, the relative velocity has a positive value and the relative acceleration also has a positive value. Therefore, during the period of time between Tb1 and Tb2, the control for gradually increasing the damping-force command signal I from the hard command signal $I_H$ to the soft command signal $I_S$ is performed by the processing performed in S41, S45, S55, and S56' of FIG. 10.

During a period of time between Tb2 and Tb3 of FIG. 12, the relative velocity has a positive value, whereas the relative acceleration has a negative value. Then, by the processing performed in S55 and S57' of FIG. 10, the damping force is set so as to be on the soft side.

Next, during a period of time between Tb3 and Tb4, the relative velocity has a negative value and the relative acceleration also has a negative value. Therefore, the control for gradually reducing the damping-force command signal I from the soft command signal $I_S$ to the hard command signal $I_H$ is performed by the processing performed in S45, S46, and S49' of FIG. 10.

After time Tb4 shown in FIG. 12, the relative velocity has a negative value, whereas the relative acceleration has a positive value. Then, by the processing performed in S46 and S47' of FIG. 10, the damping-force is set so as to be on the hard side.

Even in the second embodiment configured as described above, the damper control for the wheel whose wheel load is desired to be increased or reduced is performed while the damping-force characteristic is switched between the early stage and the latter stage of the compression stroke and between the early stage and the latter stage of the extension stroke, as illustrated in FIGS. 10 to 12. In this manner, both of the hard and soft characteristics are achieved for the responsiveness to increase the wheel load and the maximum amount of increase in wheel load, and the responsiveness to lose the wheel load and the maximum amount of loss in wheel load.

In the first embodiment, when the control is performed for the wheel whose wheel load is desired to be increased, the responsiveness and the maximum amount of the wheel load can be controlled. However, when the damping-force characteristic is suddenly switched as indicated by, for example, the characteristic line 15 of the compression stroke, which is shown in a solid line in FIG. 6, the wheel load is sometimes suddenly lost to fluctuate. In the same manner, when the damping-force characteristic is suddenly switched as indicated by, for example, the characteristic line 25 of the extension stroke, which is shown in a solid line in FIG. 7, the wheel load is sometimes suddenly lost.

Therefore, in the second embodiment, the damping force of each of the damping-force variable dampers 6 and 9 is smoothly switched on the side of the wheel whose wheel load is desired to be increased, as illustrated in FIGS. 10 and 11. Similarly, the damping force of each of the damping-force variable dampers 6 and 9 is smoothly switched even on the side of the wheel whose wheel load is desired to be reduced, as illustrated in FIGS. 10 and 12.

Specifically, during the compression stroke for the wheel whose wheel load is desired to be increased, the damping-force characteristic in the early stage is set to the hard side as indicated by a characteristic line 70 shown in FIG. 11. Then, the signal is gradually increased to smoothly switch the damping force. As a result, unlike the case of the wheel load according to the first embodiment (indicated by the characteristic line 15 shown in FIG. 6), the wheel load is not suddenly lost, and the responsiveness to increase the wheel load is equal to that in the case where the damping-force characteristic is set to the hard side (indicated by a characteristic line 63). At the same time, the maximum value of the wheel load is made larger than that in the case where the damping-force characteristic is set to the soft side (indicated by a characteristic line 62). In this manner, the characteristics of both the responsiveness and the maximum value are achieved.

Moreover, even during the extension stroke for the wheel whose wheel load is desired to be increased, the damping force is smoothly switched from the soft side to the hard side. As a result, the wheel load is not suddenly lost unlike the case of the wheel load according to the first embodiment (indicated by the characteristic line 25 shown in FIG. 7). In this manner, the amount of loss in wheel load is reduced as compared with the case where the damping-force characteristic is fixed to the soft side (indicated by the characteristic line 62).

On the other hand, during the extension stroke for the wheel whose wheel load is desired to be reduced, the damping-force characteristic in the early stage is set to the hard side as indicated by a characteristic line 80 shown in FIG. 12. Then, the signal is gradually increased to smoothly switch the damping force. As a result, unlike the case of the wheel load according to the first embodiment (indicated by the characteristic line 35 shown in FIG. 8), the wheel load is not suddenly fluctuated, and the responsiveness to reduce (lose) the wheel load is equal to that in the case where the damping-force characteristic is set to the hard side (indicated by a characteristic line 73). At the same time, the maximum value of loss in wheel load is made larger than that in the case where the damping-force characteristic is set to the soft side (indicated by a characteristic line 72). In this manner, the characteristics of both the responsiveness and the maximum value are achieved.

Moreover, even during the compression stroke for the wheel whose wheel load is desired to be reduced, the damping-force characteristic in the early stage is set to the soft side as indicated by a characteristic line 80 shown in FIG. 12. Then, the damping force is smoothly switched from the soft side to the hard side. As a result, the wheel load is not suddenly fluctuated unlike the case of the wheel load according to the first embodiment (indicated by the characteristic line 45 shown in FIG. 9). In this manner, the amount of increase in wheel load is reduced as compared with the case where the damping-force characteristic is fixed to the soft side (indicated by the characteristic line 72).

Figure 13:
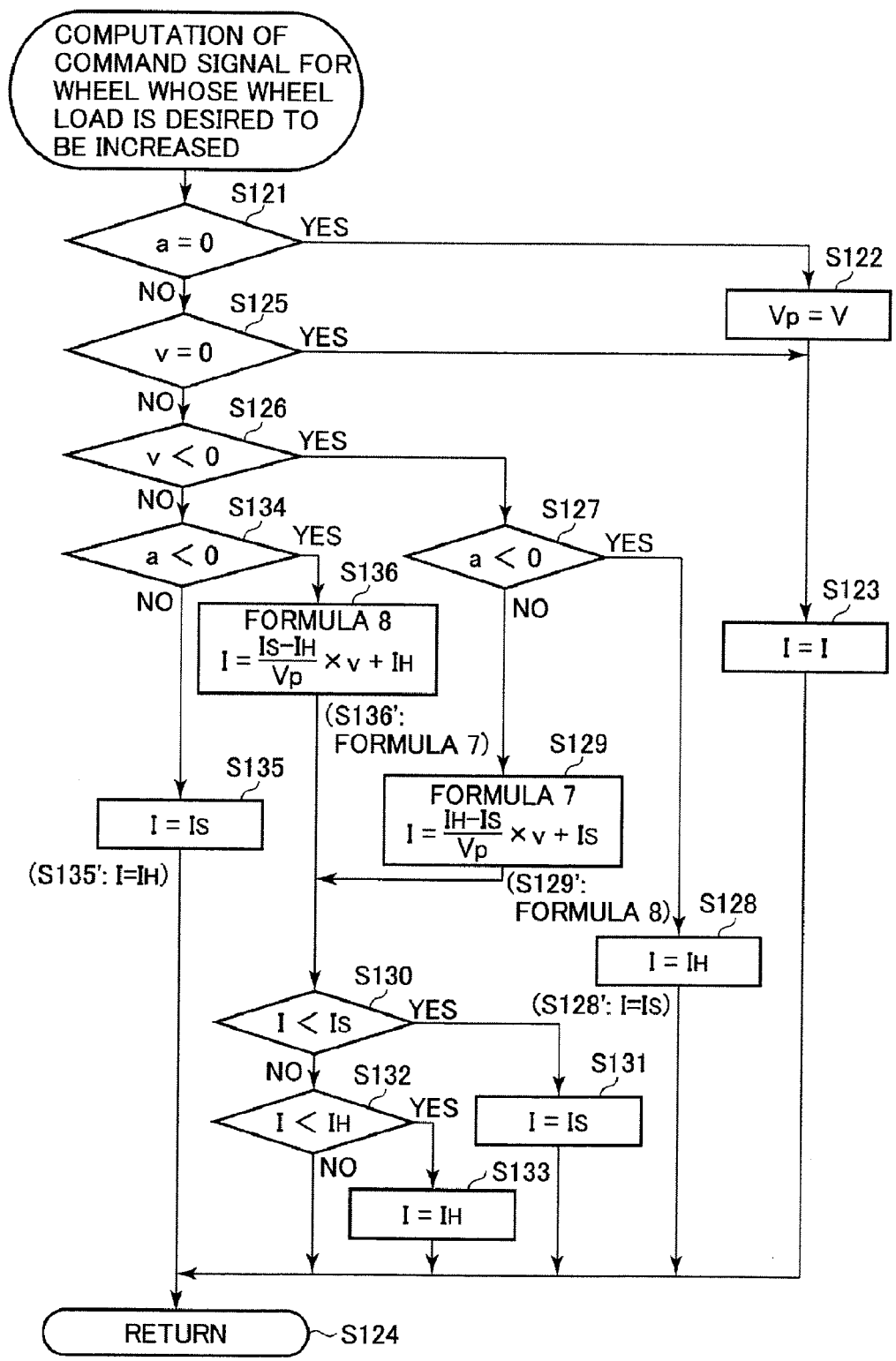
FIG. 13 is a flowchart illustrating command-signal computation processing for obtaining responsiveness on the side of the wheel whose wheel load is desired to be increased, which is illustrated in FIG. 4, according to a third embodiment.

Next, FIG. 13 illustrates a third embodiment of the present invention. The third embodiment is characterized in that the damping-force characteristic of the shock absorber (damper) is continuously and smoothly switched between the hard side and the soft side so as to smoothly perform the control for increasing the wheel load and the control for reducing the wheel load. There are some methods for performing the smooth switching between the two types of control. In the third embodiment, the switching is started at the time of inversion of the sign of the acceleration. Within a predetermined period of time, the control is gradually switched from one type of control to the other type of control.

In the third embodiment, the same components as those of the first or second embodiment described above are denoted by the same reference symbols, and the description thereof is herein omitted.

The computation of the damping-force command signal on the side of the wheel whose wheel load is desired to be increased, which is performed in S13 of FIG. 4, is performed according to computation processing illustrated in FIG. 13. The processing is performed mainly to improve the responsiveness of the wheel load. In S121 of FIG. 13, whether or not a compression/extension acceleration of the damper, specifically, whether or not the relative acceleration "a" between the sprung side and the unsprung side is zero (a=0) is determined. In this case, the relative acceleration "a" between the sprung side and the unsprung side is calculated by the processing performed in S4 of FIG. 3.

Then, when it is determined as "YES" (specifically, the relative acceleration "a" is zero) in S121, the processing proceeds to subsequent S122 in which a factor $v_p$ described below is set to the relative velocity "v" between the sprung side and the unsprung side. In this case, the relative velocity "v" between the sprung side and the unsprung side is calculated by the processing performed in S4 of FIG. 3. In subsequent S123, the damping-force command signal I is set to a signal for maintaining the previous damping-force command signal I. Then, in subsequent S124, the processing returns.

In S125, whether or not a compression/extension rate of the damper, specifically, the relative velocity "v" is zero (v=0) is determined. When it is determined as "YES" in S125, the processing in S123 and S124 described above is performed. When it is determined as "NO" in S125, the processing proceeds to subsequent S126 in which whether or not the relative velocity "v" is negative (v<0) is determined. When it is determined as "YES" (specifically, the relative velocity "v" is negative) in S126, the processing proceeds to subsequent S127 in which whether or not the relative acceleration "a" is negative (a<0) is determined.

When it is determined as "YES" (specifically, the relative acceleration "a" is negative) in S127, the processing proceeds to subsequent S128 in which the damping-force command signal I is set to the hard command signal $I_H$ so as to increase a rate of increase in wheel load of the corresponding wheel during the compression stroke. The hard command signal $I_H$ is a signal for relatively shifting the command signal to the hard side by a predetermined value as compared with the previous damping-force command signal I and therefore does not necessarily denote a two-step switching signal between the soft characteristic and the hard characteristic. The hard command signal $I_H$ may be changed according to other conditions such as the vehicle velocity. After the processing performed in S128, the processing returns in subsequent S124.

When it is determined as "NO" (specifically, the relative acceleration "a" is positive) in S127, the processing proceeds to subsequent S129 in which the damping-force command signal I is computed so as to satisfy Formula 7 described below. The factor $v_p$ is a constant determined by experimental data or the like. The damping-force command signal I in Formula 7 is computed as a signal increasing from the hard command signal $I_H$ to the soft command signal $I_S$ ($I_S > I_H$) in proportion to the relative velocity "v".

$$I = \frac{I_H - I_S}{v_p} \times v + I_S \qquad \text{[Formula 7]}$$

In subsequent S130, it is determined whether or not the damping-force command signal I computed in S129 described above is larger than the soft command signal $I_S$ ($I > I_S$). When it is determined as "YES", the processing proceeds to subsequent S131 in which saturation processing is performed to set the damping-force command signal I to the soft command signal $I_S$. When it is determined as "NO" in S130, it can be determined that the damping-force command signal I is smaller than the soft command signal $I_S$. Therefore, the processing proceeds to subsequent S132 in which whether or not the damping-force command signal I is smaller than the hard command signal $I_H$ ($I < I_H$) is determined. When it is determined as "YES" in S132, the processing proceeds to subsequent S133 in which the saturation processing is performed to set the damping-force command signal I to the hard command signal $I_H$.

On the other hand, when it is determined as "NO" in S126, the processing proceeds to subsequent S134 in which whether or not the relative acceleration "a" is negative (a<0) is determined. When it is determined as "NO" in S134, the processing proceeds to subsequent S135 in which the damping-force command signal I is set to the soft command signal $I_S$. The soft command signal $I_S$ is a signal for relatively shifting the command signal to the soft side by a predetermined value as compared with the previous damping-force command signal I and therefore does not necessarily denote a two-step switching signal between the soft characteristic and the hard characteristic. The soft command signal $I_S$ may be changed according to other conditions such as the vehicle velocity. After the processing performed in S135, the processing returns in subsequent S124.

When it is determined as "YES" (specifically, the relative acceleration "a" is negative) in S134, the processing proceeds to subsequent S136 in which the damping-force command signal I is computed so as to satisfy Formula 8 described below. The factor $v_p$ is a constant determined by experimental data or the like. The damping-force command signal I in Formula 8 is computed as a signal reducing from the soft command signal $I_S$ to the hard command signal $I_H$ in proportion to the relative velocity "v".

$$I = \frac{I_S - I_H}{v_p} \times v + I_H \quad \text{[Formula 8]}$$

Then, even for the damping-force command signal I obtained in S136 described above, the saturation processing is performed in S130 to S133 described above. Thereafter, in subsequent S124, the processing returns. The relative acceleration "a" and the relative velocity "v" sometimes vibrate in the vicinity of zero (0) due to the effects of noise or the like to be repeatedly inverted between positive and negative. In such a case, in S121, S125, S126, S127, and S134, the range of value in which each of the relative acceleration "a" and the relative velocity "v" becomes nearly zero may be set. Alternatively, the fact that the phase difference between the relative velocity "v" and the relative acceleration "a" is 90 degrees may be used. In this manner, the compression stroke and the extension stroke are distinguished from each other.

Figure 15:
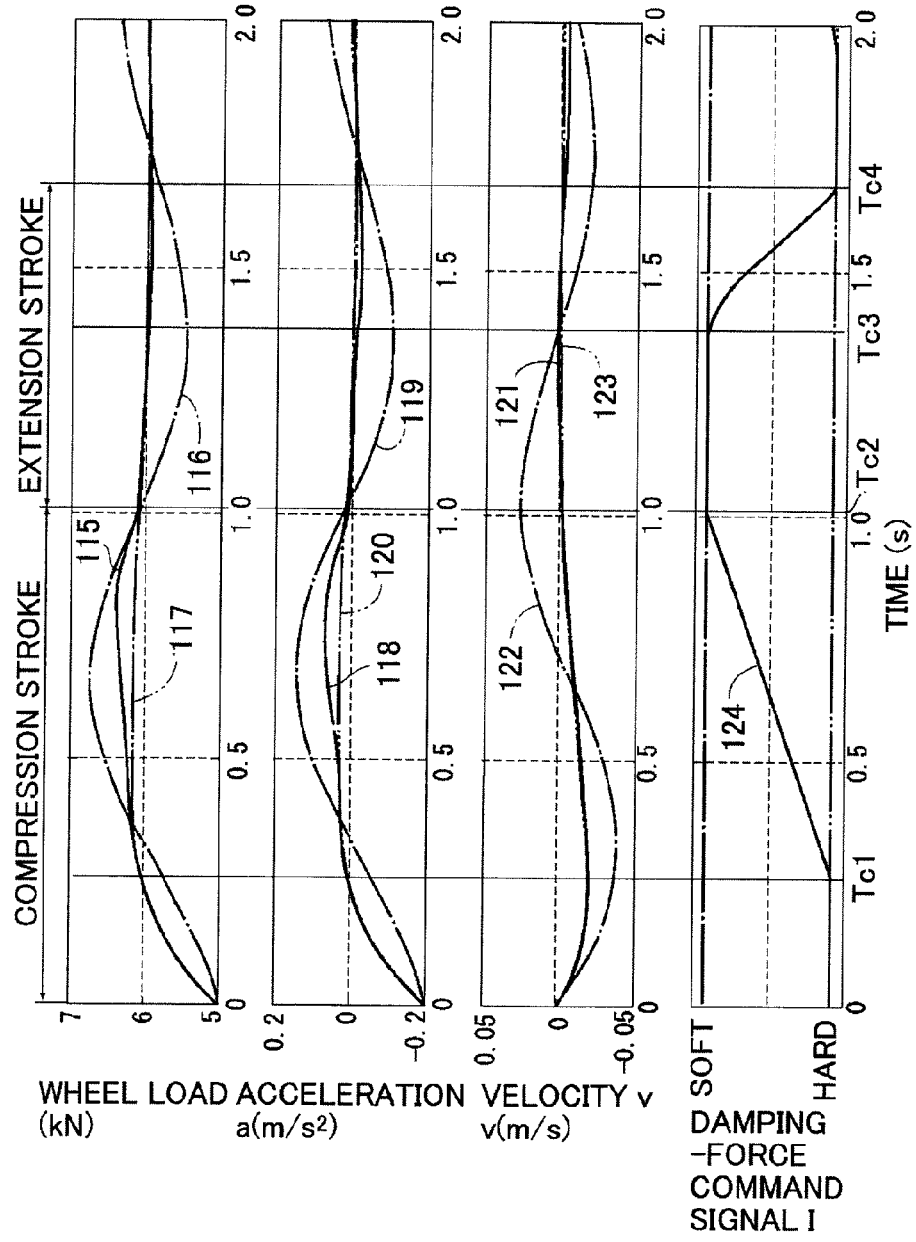
FIG. 15 is a characteristic line diagram of the wheel load, the acceleration rate, the velocity, and a damping-force command signal, for showing the control for obtaining the responsiveness on the side of the wheel whose wheel load is desired to be increased, in comparison with the case where the damping force is fixed to the hard side and the case where the damping force is fixed to the soft side.

Characteristic lines shown in FIG. 15 show experimental data during the compression stroke and the extension stroke in the case where the command signal computation processing for the wheel whose wheel load is desired to be increased (computation processing performed mainly to obtain the responsiveness), illustrated in FIG. 13, is used for the suspension control of the vehicle.

For example, during a period of time between 0 and Tc1 shown in FIG. 15, the relative acceleration "a" is negative as indicated by a characteristic line 118 shown in a solid line and the relative velocity "v" is also negative as indicated by a characteristic line 121 shown in a solid line. Therefore, during this period of time, the damping-force command signal I is set to the hard command signal $I_H$ by the processing performed in S126, S127, and S128 shown in FIG. 13 so as to increase the wheel load of the corresponding wheel during the compression stroke. Therefore, for example, during the period of time between 0 and Tc1, as indicated by a characteristic line 115 shown in a solid line, the characteristic of the wheel load according to the third embodiment is set to the wheel-load characteristic (characteristic in which the wheel load increases rapidly as compared with the wheel load indicated by the characteristic line 116 in the case where the damping force is fixed to the soft side) similar to the wheel-load characteristic in the case where the damping force is fixed to the hard side (indicated by a characteristic line 117 shown in a long dashed double-short dashed line).

After time Tc1 shown in FIG. 15, the sign of the value of the relative acceleration "a" changes from negative to positive. On the other hand, the value of the relative velocity "v" is negative until time Tc2. Therefore, during a period of time between Tc1 and Tc2, the damping-force command signal I is set according to Formula 7 described above so as to increase from the hard command signal $I_H$ to the soft command signal $I_S$ in proportion to the relative velocity "v" (see a characteristic line 124) by the processing performed in S126, S127, and S129 of FIG. 13. In this manner, the characteristic of the damping force on the side of the corresponding wheel is controlled so as to be gradually switched from the hard side to the soft side.

Next, during a period of time between Tc2 and Tc3, the relative velocity "v" has a positive value, and the relative acceleration "a" also has a positive value. Therefore, during this period of time, the damping-force command signal I is set to the soft command signal $I_S$ by the processing performed in S126, S134, and S135 of FIG. 13 so that the wheel load of the corresponding wheel is set to be increased, specifically, so as not to be reduced during the extension stroke. Therefore, for example, during the period of time between Tc2 and Tc3, the characteristic of the wheel load according to the third embodiment is set as indicated by the characteristic line 115 shown in a solid line.

Next, during a period of time between Tc3 and Tc4, the relative velocity "v" has a positive value, whereas the value of the relative acceleration "a" changes from positive to negative. Therefore, during the period of time between Tc3 and Tc4, the damping-force command signal I is set so as to be reduced from the soft command signal $I_S$ to the hard command signal $I_H$ in proportion to the relative velocity "v" according to Formula 8 described above (see the characteristic line 124) by the processing performed in S126, S134, and S136 of FIG. 13. In this manner, the characteristic of the damping force on the side of the corresponding wheel is controlled to be gradually switched from the soft side to the hard side. After time Tc4, the relative velocity "v" has a negative value, and the relative acceleration "a" also has a negative value. Therefore, the damping-force command signal I is set to the hard command signal $I_H$ by the processing performed in S126, S127, and S128 of FIG. 13.

As described above, according to the third embodiment, in the control for obtaining the responsiveness on the side of the wheel whose wheel load is desired to be increased, as indicated by the characteristic line 124 shown in a solid line in FIG. 15, the damping-force command is set to the hard side (the damping-force command signal I is set to the hard command signal $I_H$) in the early stage of the compression stroke (for example, during the period of time between 0 and Tc1) and is set so as to be gradually switched from the hard side to the soft side in the latter stage of the compression stroke (for example, during the period of time between Tc1 and Tc2). In this manner, hard-to-soft switching control during the compression stroke is performed.

By the hard-to-soft switching control during the compression stroke, the wheel load can be quickly raised as indicated by the characteristic line 115 to improve the responsiveness during the compression stroke on the side of the wheel whose wheel load is desired to be increased. Therefore, the wheel load can be prevented from suddenly changing so that the wheel load can be smoothly controlled for the subsequent extension stroke.

The damping-force command is set to the soft side (the damping-force command signal I is set to the soft command signal $I_S$) in the early stage of the extension stroke (for example, during the period of time between Tc2 and Tc3) and is set so as to be gradually switched from the soft side to the hard side in the latter stage (for example, during the period of time between Tc3 and Tc4). In this manner, soft-to-hard switching control during the extension stroke is performed.

By the soft-to-hard switching control during the extension stroke, the responsiveness can be ensured so as not to reduce the wheel load during the period of time between Tc2 and Tc3, as indicated by the characteristic line 115, during the extension stroke on the side of the wheel whose wheel load is desired to be increased. During the period of time between Tc3 and Tc4, the wheel load is prevented from suddenly changing so that the wheel load can be smoothly controlled for the subsequent compression stroke.

Figure 14:
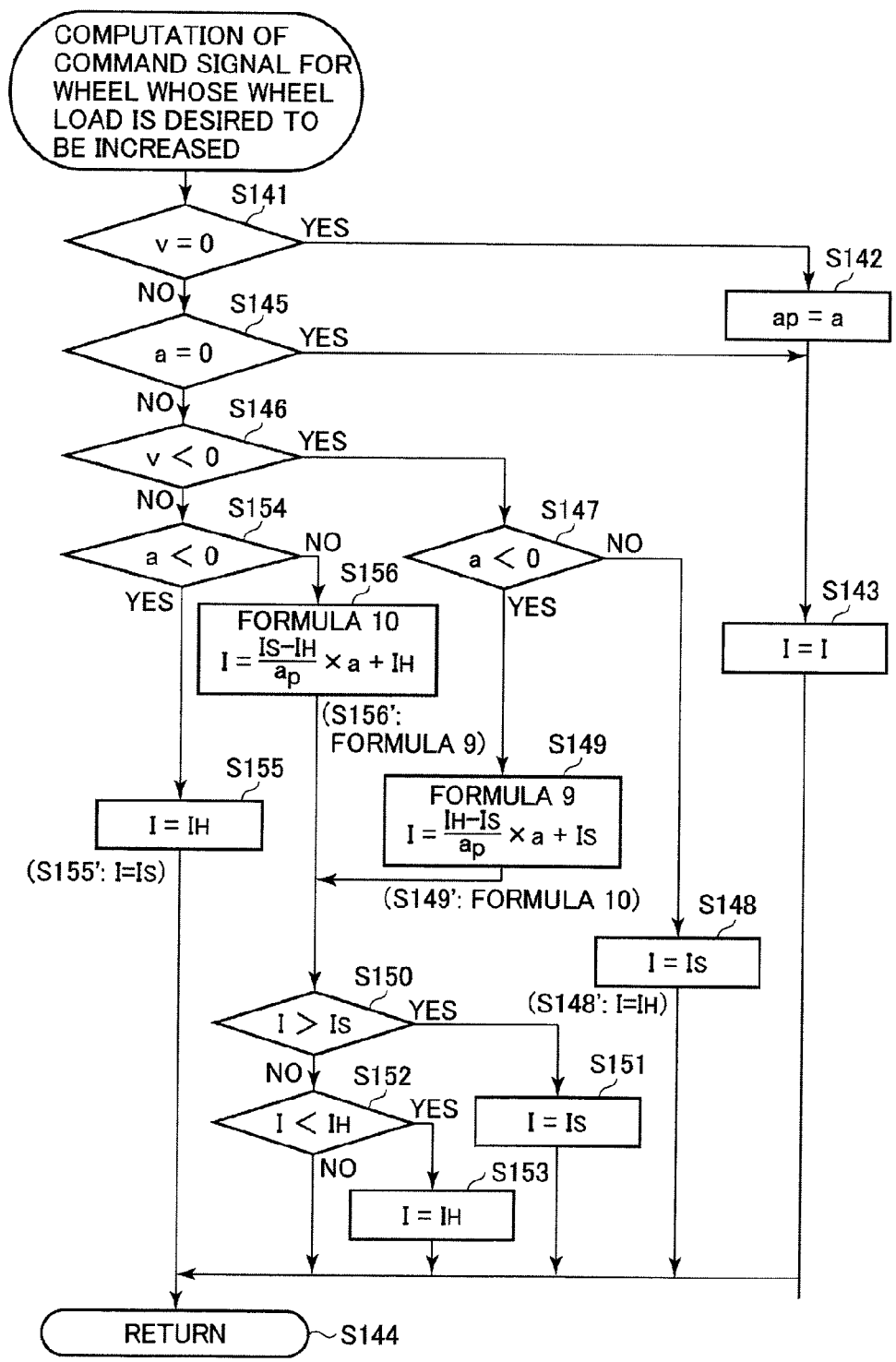
FIG. 14 is a flowchart illustrating the command-signal computation processing for obtaining an absolute amount on the side of the wheel whose wheel load is desired to be increased, which is illustrated in FIG. 4, according to a fourth embodiment.

Next, as a fourth embodiment, computation processing for obtaining an absolute amount of the wheel load is illustrated in FIG. 14. The processing is for computing the command signal of the damping force on the side of the wheel whose wheel load is desired to be increased, which is performed in S13 described above. In S141 of FIG. 14, whether or not the compression/extension rate of the damper, specifically, the relative velocity "v" is zero (v=0) is determined. In this case, the relative velocity "v" between the sprung side and the unsprung side is calculated by the processing performed in S4 of FIG. 3.

When it is determined as "YES" (specifically, the relative velocity "v" is zero) in S141, the processing proceeds to subsequent S142 in which a factor $a_p$ described below is set to the relative acceleration "a" between the sprung side and the unsprung side. In this case, the relative acceleration "a" between the sprung side and the unsprung side is calculated by the processing performed in S4 of FIG. 3. In subsequent S143, the damping-force command signal I is set to the signal for maintaining the previous damping-force command signal I. Thereafter, the processing returns in subsequent S144.

In S145, whether or not the compression/extension rate of the damper, specifically, the relative acceleration "a" between the sprung side and the unsprung side is zero (a=0) is determined. When it is determined as "YES" in S145, the processing in S143 and S144 described above is performed. When it is described as "NO" in S145, the processing proceeds to subsequent S146 in which whether or not the relative velocity "v" is negative (v<0) is determined. When it is determined as "YES" (specifically, the relative velocity "v" is negative) in S146, the processing proceeds to subsequent S147 in which whether or not the relative acceleration "a" is negative (a<0) is determined.

When it is determined as "NO" (specifically, the relative acceleration "a" is positive) in S147, the processing proceeds to subsequent S148 in which the damping-force command signal I is set to the soft command signal $I_S$ so as to increase the wheel load of the corresponding wheel during the compression stroke. After the processing in S148, the processing returns in subsequent S144.

When it is determined as "YES" (specifically, the relative acceleration "a" is negative) in S147, the processing proceeds to subsequent S149 in which the damping-force command signal I is computed so as to satisfy Formula 9 described below. The factor $a_p$ is a constant determined by experimental data or the like. The damping-force command signal I in Formula 9 is computed as a signal increasing from the hard command signal $I_H$ to the soft command signal $I_S$ ($I_S > I_H$) in proportion to the relative acceleration "a".

$$I = \frac{I_H - I_S}{a_P} \times a + I_S \quad \text{[Formula 9]}$$

Even for the damping-force command signal I obtained in S149 described above, the saturation processing (S150 to S153) is performed in the same manner as that for the processing in S130 to S133 described above. Thereafter, in subsequent S144, the processing returns. On the other hand, when it is determined as "NO" in S146, the processing proceeds to subsequent S154 in which whether or not the relative acceleration "a" is negative (a<0) is determined. Then, when it is determined as "YES" in S154, the processing proceeds to subsequent S155 in which the damping-force command signal I is set to the hard command signal $I_H$. After the processing in S155, the processing returns in subsequent S144.

When it is determined as "NO" (specifically, the relative acceleration "a" is positive) in S154, the processing proceeds to subsequent S156 in which the damping-force command signal I is computed so as to satisfy Formula 10 described below. The factor $a_p$ is a constant determined by experimental data or the like. The damping-force command signal I in Formula 10 is computed as a signal reducing from the soft command signal $I_S$ to the hard command signal $I_H$ in proportion to the relative acceleration "a".

$$I = \frac{I_S - I_H}{a_P} \times a + I_H \quad \text{[Formula 10]}$$

Then, even for the damping-force command signal I obtained in S156 described above, the saturation processing is performed in S150 to S153 described above. Thereafter, in subsequent S144, the processing returns. The relative acceleration "a" and the relative velocity "v" sometimes vibrate in the vicinity of zero (0) due to the effects of noise or the like to be repeatedly inverted between positive and negative. In such a case, in S141, S145, S146, S147, and S154, the range of value in which each of the relative acceleration "a" and the relative velocity "v" becomes nearly zero may be set. Alternatively, the fact that the phase difference between the relative velocity "v" and the relative acceleration "a" is 90 degrees may be used. In this manner, the compression stroke and the extension stroke are distinguished from each other.

Figure 16:
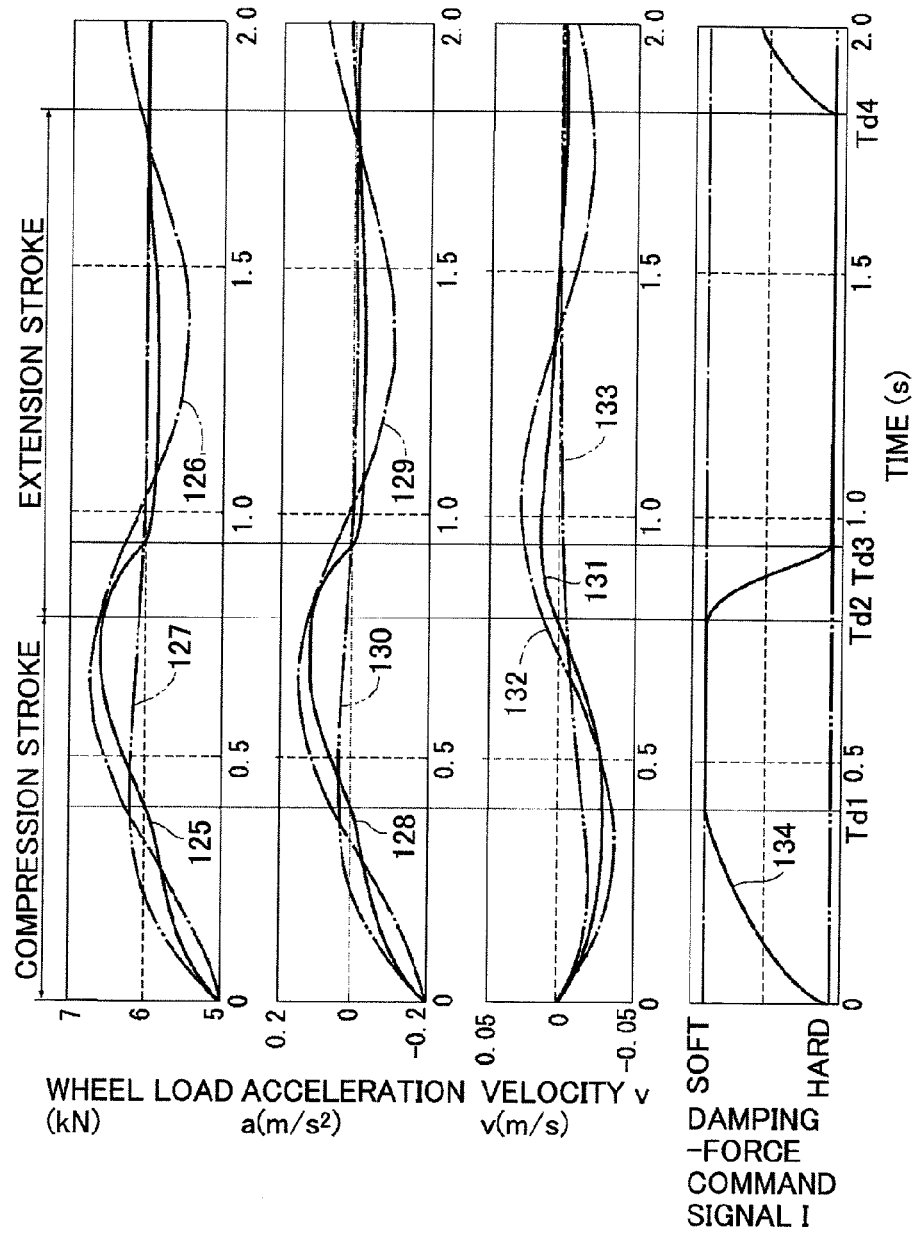
FIG. 16 is a characteristic line diagram of the wheel load, the acceleration rate, the velocity, and the damping-force command signal, for showing the control for obtaining the absolute value on the side of the wheel whose wheel load is desired to be increased, in comparison with the case where the damping force is fixed to the hard side and the case where the damping force is fixed to the soft side.

Characteristic lines shown in FIG. 16 show experimental data during the compression stroke and the extension stroke in the case where the command signal computation processing for the wheel whose wheel load is desired to be increased (computation processing performed mainly to obtain the absolute amount), illustrated in FIG. 14, is used for the suspension control of the vehicle.

During a period of time between 0 and Td1 shown in FIG. 16, the relative acceleration "a" is negative as indicated by a characteristic line 128 shown in a solid line and the relative velocity "v" is also negative as indicated by a characteristic line 131 shown in a solid line. During this period of time, the damping-force command signal I is set according to Formula 9 described above so as to be increased from the hard command signal $I_H$ to the soft command signal $I_S$ in proportion to the relative acceleration "a" (see a characteristic line 134) by the processing in S146, S147, and S149 illustrated in FIG. 14. In this manner, the characteristic of the damping force on the side of the corresponding wheel is controlled to be gradually switched from the hard side to the soft side.

Then, after time Td1 shown in FIG. 16, the value of the relative acceleration "a" changes from negative to positive. The value of the relative velocity "v" is negative until time Td2. Therefore, during a period of time between Td1 and Td2, the damping-force command signal i is set to the soft command signal $I_S$ by the processing performed in S146, S147, and S148 shown in FIG. 14 so that the wheel load of the corresponding wheel is set to be increased during the compression stroke.

Next, during a period of time between Td2 and Td3, the relative velocity "v" has a positive value and the relative acceleration "a" also has a positive value. Therefore, during this period of time, the damping-force command signal I is set according to Formula 10 described above so as to be reduced from the soft command signal $I_S$ to the hard command signal $I_H$ in proportion to the relative acceleration "a" (see a characteristic line 134) by the processing performed in S146, S154, and S156 of FIG. 14. In this manner, the characteristic of the damping force on the side of the corresponding wheel is controlled so as to be gradually switched from the soft side to the hard side.

Next, during a period of time between Td3 and Td4, the relative velocity "v" has a positive value, whereas the value of the relative acceleration "a" changes from positive to negative. Therefore, during the period of time between Td3 and Td4, the damping-force command signal I is set to the hard command signal $I_H$ by the processing performed in S146, S154, and S155 shown in FIG. 14 so that the wheel load of the corresponding wheel is set to be increased, specifically, to be prevented from being reduced, during the extension stroke. After time Td4, the relative velocity "v" becomes negative, and the relative acceleration "a" becomes also negative. Therefore, the damping-force command signal I is set according to Formula 9 described above so as to be increased from the hard command signal $I_H$ to the soft command signal $I_S$ in proportion to the relative acceleration "a" by the processing performed in S146, S147, and S149 of FIG. 14.

As described above, according to the fourth embodiment, in the control for obtaining the absolute amount on the side of the wheel whose wheel load is desired to be increased, the hard-to-soft switching control during the compression stroke is performed. In this case, in the early stage of the compression stroke (for example, during the period of time between 0 and Td1), the value of the relative acceleration "a" changes from a negative peak to zero. Therefore, the damping-force command is switched from the hard side to the soft side in proportion to the relative acceleration "a". As a result, the switching of the damping force can be completed by, for example, time Td1. Accordingly, as indicated by a characteristic line 125 shown in a solid line in FIG. 16, the wheel load is prevented from suddenly changing so as to be smoothly controlled for the subsequent latter stage. In the latter stage of the compression stroke (for example, during the period of time between Td1 and Td2), the damping-force command is set to the soft characteristic. As a result, the maximum amount of the wheel load can be increased. Accordingly, the wheel load can be prevented from suddenly changing so as to be smoothly controlled for the subsequent extension stroke.

In the early stage of the extension stroke (for example, during the period of time between Td2 and Td3), the value of the relative acceleration "a" changes from a positive peak to zero. Therefore, the soft-to-hard switching control during the extension stroke is performed so that the damping-force command is switched from the soft side to the hard side in proportion to the relative acceleration "a". As a result, the switching of the damping force can be completed by, for example, time Td3. Accordingly, the wheel load can be prevented from suddenly changing so as to be smoothly controlled for the subsequent latter stage. In the latter stage of the extension stroke (for example, during the period of time between Td3 and Td4), the damping-force command is set to the hard characteristic. As a result, the wheel load is prevented from being reduced to obtain the effects in terms of the maximum amount. In this manner, the wheel load can be prevented from suddenly changing so as to be smoothly controlled for the subsequent compression stroke.

Next, a fifth embodiment is realized by embodying the processing for computing the command signal of the damping force on the side of the wheel whose wheel load is desired to be reduced, which is performed in S15 shown in FIG. 4. The processing is performed mainly to improve the responsiveness of the wheel load.

The damping-force computation processing for the wheel whose wheel load is desired to be reduced is substantially the same as the damping-force computation processing for the wheel whose load is desired to be increased according to the third embodiment. Therefore, only differences therebetween are described referring to FIG. 13.

In the computation of the damping force for the wheel whose wheel load is desired to be reduced, S128 of FIG. 13 is replaced by S128', and a computation (computation performed in S135 of FIG. 13) for setting the damping-force command signal I to the soft command signal $I_S$ is performed in S128'. S129 of FIG. 13 is replaced by S129', and the damping-force command signal I is computed in S129' (computation in S136 of FIG. 13 is performed) so as to satisfy Formula 8. S136 of FIG. 13 is replaced by S136', and the damping-force command signal I is computed in S136' (computation in S129 of FIG. 13 is performed) so as to satisfy Formula 7. Further, S135 of FIG. 13 is replaced by S135', and a computation (computation performed in S128 of FIG. 13) for setting the damping-force command signal I to the hard command signal $I_H$ is performed in S135'.

Figure 17:
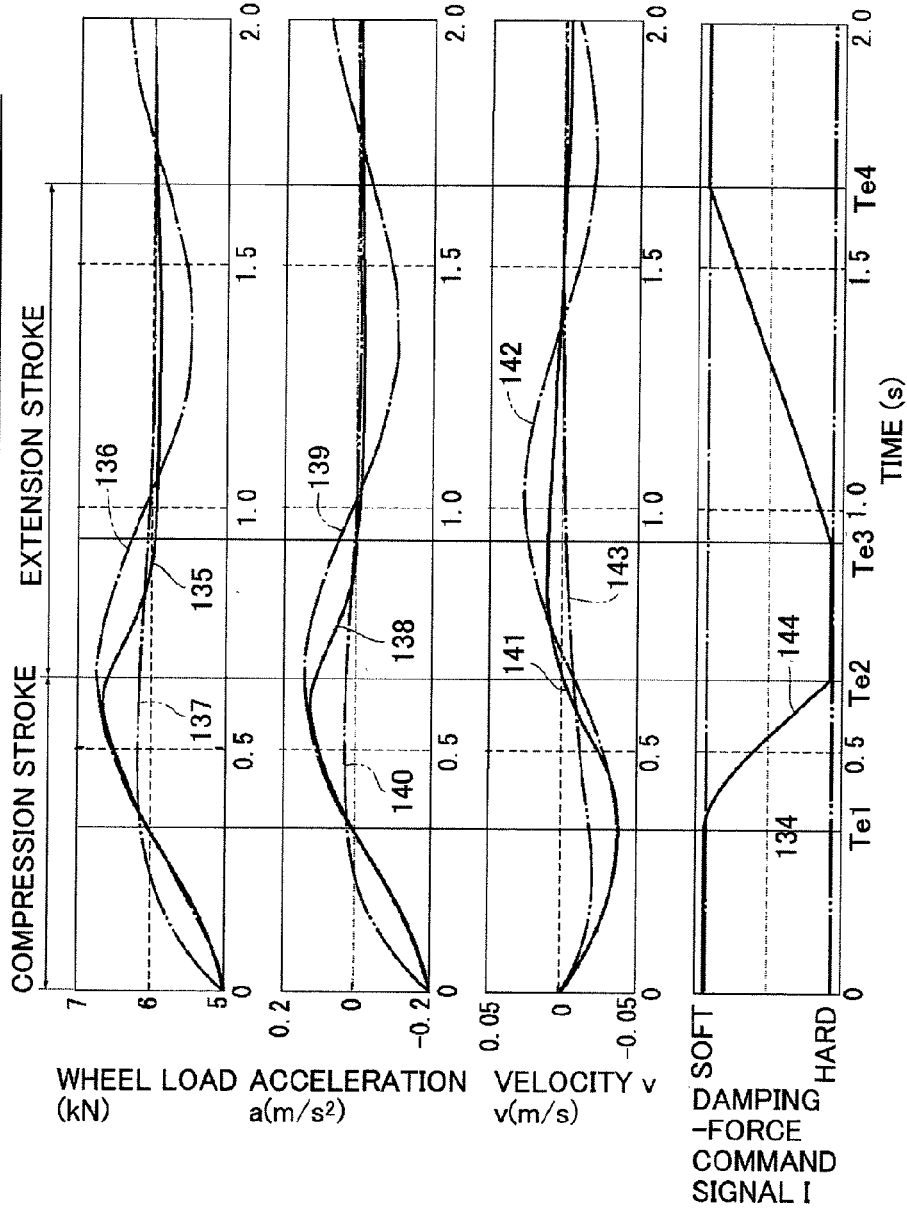
FIG. 17 is a characteristic line diagram of the wheel load, the acceleration rate, the velocity, and the damping-force command signal, for showing the control for obtaining the responsiveness on the side of the wheel whose wheel load is desired to be reduced, in comparison with the case where the damping force is fixed to the hard side and the case where the damping force is fixed to the soft side.

Characteristic lines shown in FIG. 17 show experimental data during the compression stroke and the extension stroke in the case where the command signal computation processing for the wheel whose wheel load is desired to be reduced (computation processing performed mainly to obtain the responsiveness) is used for the suspension control of the vehicle.

During a period of time between 0 and Te1 shown in FIG. 17, the relative acceleration "a" is negative as indicated by a characteristic line 138 shown in a solid line and the relative velocity "v" is also negative as indicated by a characteristic line 141 shown in a solid line. Therefore, during this period of time, the damping-force command signal I is set to the soft command signal $I_S$ by the processing performed in S126, S127, and S128' (content of S135) of FIG. 13 so as not to increase, but to relatively reduce the wheel load of the corresponding wheel during the compression stroke.

After time Te1 shown in FIG. 17, the sign of the value of the relative acceleration "a" changes from negative to positive. On the other hand, the value of the relative velocity "v" is negative until time Te2. Therefore, during a period of time between Te1 and Te2, the damping-force command signal I is set according to Formula 8 described above so as to be reduced from the soft command signal $I_S$ to the hard command signal $I_H$ in proportion to the relative velocity "v" (see a characteristic line 144) by the processing performed in S126, S127, and S129' (content of S136) of FIG. 13. In this manner, the characteristic of the damping force on the side of the corresponding wheel is controlled so as to gradually change from the soft side to the hard side.

Next, during a period of time between Te2 and Te3, the relative velocity "v" has a positive value, and the relative acceleration "a" also has a positive value. Therefore, during this period of time, the damping-force command signal I is set to the hard command signal $I_H$ by the processing performed in S126, S134, and S135' (content of S128) of FIG. 13 so that the wheel load of the corresponding wheel is set to be reduced during the extension stroke. Therefore, for example, during the period of time between Te2 and Te3, the characteristic of the wheel load according to the fifth embodiment is set as indicated by the characteristic line 135 shown in a solid line.

Next, during a period of time between Te3 and Te4, the relative velocity has a positive value, whereas the value of the relative acceleration "a" changes from positive to negative. Therefore, during the period of time between Te3 and Te4, the damping-force command signal I is set so as to be increased from the hard command signal $I_H$ to the soft command signal $I_S$ in proportion to the relative velocity "v" according to Formula 7 described above (see the characteristic line 144) by the processing performed in S126, S134, and S136' (content of S129) of FIG. 13. In this manner, the characteristic of the damping force on the side of the corresponding wheel is controlled to be gradually switched from the hard side to the soft side. After time Te4, the relative velocity "v" has a negative value, and the relative acceleration "a" also has a negative value. Therefore, the damping-force command signal I is set to the soft command signal $I_S$ by the processing performed in S126, S127, and S128' (content of S135) of FIG. 13.

Accordingly, according to this embodiment, in the control for obtaining the responsiveness on the side of the wheel whose wheel load is desired to be reduced, the damping-force command is set to the soft side (the damping-force command signal I is set to the soft command signal $I_S$) in the early stage of the compression stroke (for example, during the period of time between 0 and Te1) and is gradually switched from the soft characteristic to the hard characteristic in the latter stage of the compression stroke (for example, during the period of time between Te1 and Te2) as indicated by the characteristic line 144 shown in a solid line in FIG. 17. In this manner, the soft-to-hard switching control during the compression stroke is performed. As a result, the increase in wheel load (maximum value of the wheel load) is reduced to improve the responsiveness during the compression stroke on the side of the wheel whose wheel load is desired to be reduced, as indicated by the characteristic line 135. Accordingly, the wheel load can be prevented from suddenly changing so as to be smoothly controlled for the subsequent extension stroke.

In the early stage of the extension stroke (for example, during the period of time between Te2 and Te3), the damping-force command is set to the hard side (the damping-force command signal I is set to the hard command signal $I_H$). In the latter stage (for example, during the period of time between Te3 and Te4), the damping-force command is gradually switched from the hard characteristic to the soft characteristic. In this manner, the hard-to-soft switching control during the extension stroke is performed. As a result, during the extension stroke on the side of the wheel whose wheel load is desired to be reduced, the wheel load can be quickly reduced during the period of time between Te2 and Te3 so as to improve the responsiveness to lose the wheel load. During the period of time between Te3 and Te4, the wheel load can be prevented from suddenly changing so as to be smoothly controlled for the subsequent compression stroke.

Next, computation processing for obtaining the absolute amount of the wheel load according to a sixth embodiment is described. This processing is for computing the damping-force command signal on the side of the wheel whose wheel load is desired to be reduced, which is performed in S15 of FIG. 4.

The damping-force computation processing for the wheel whose wheel load is desired to be reduced is substantially the same as the damping-force computation processing for the wheel whose load is desired to be increased according to the fourth embodiment. Therefore, only differences therebetween are described referring to FIG. 14.

In the computation of the damping force for the wheel whose wheel load is desired to be reduced, S148 of FIG. 14 is replaced by S148', and a computation (computation performed in S155 of FIG. 14) for setting the damping-force command signal I to the hard command signal $I_H$ is performed in S148'. S149 of FIG. 14 is replaced by S149', and the damping-force command signal I is computed in S149' (computation in S156 of FIG. 14 is performed) so as to satisfy Formula 10. S156 of FIG. 14 is replace by S156', and the damping-force command signal I is computed in S156' (computation in S149 of FIG. 14 is performed) so as to satisfy Formula 9. Further, S155 of FIG. 14 is replaced by S155', and a computation (computation performed in S148 of FIG. 14) for setting the damping-force command signal I to the soft command signal $I_S$ is performed in S155'.

Figure 18:
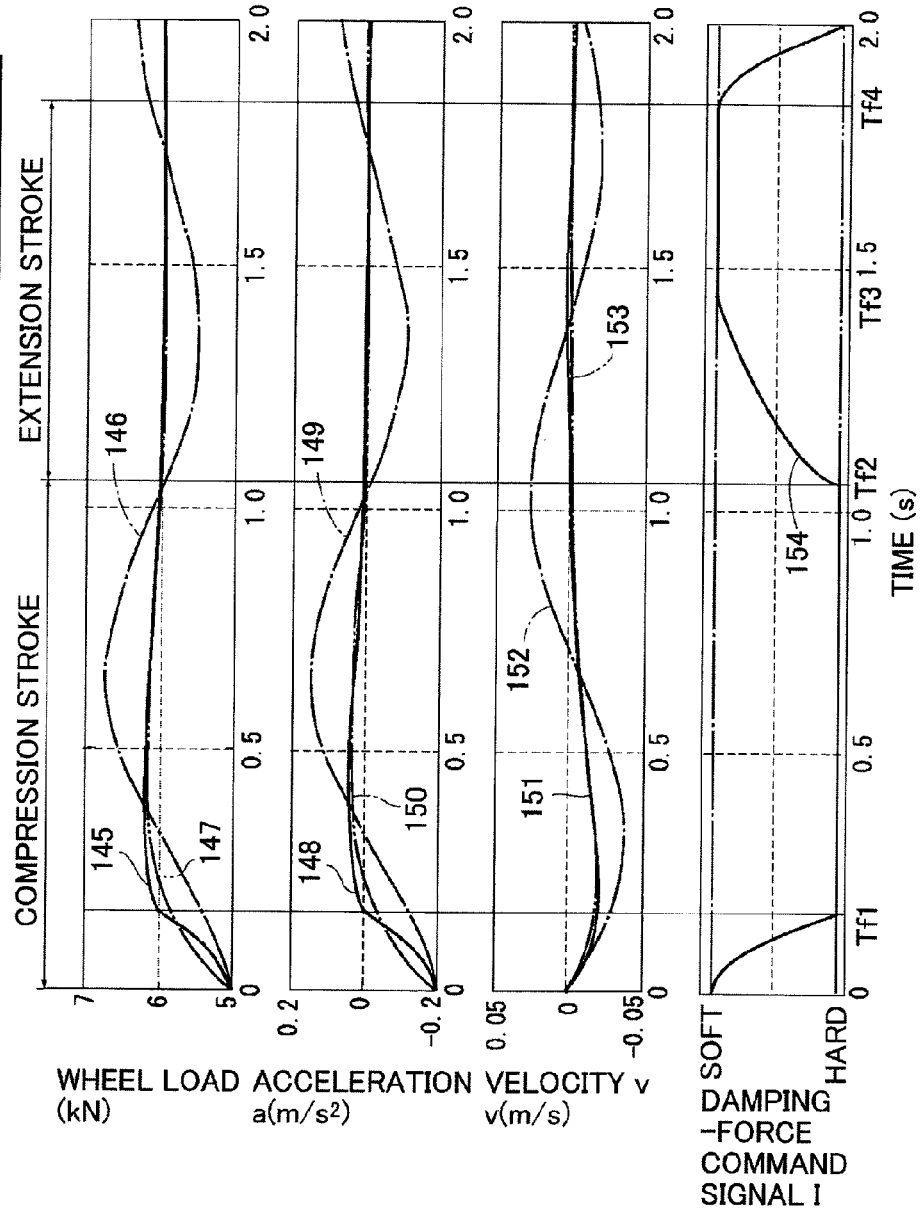
FIG. 18 is a characteristic line diagram of the wheel load, the acceleration rate, the velocity, and the damping-force command signal, for showing the control for obtaining the absolute value on the side of the wheel whose wheel load is desired to be reduced, in comparison with the case where the damping force is fixed to the hard side and the case where the damping force is fixed to the soft side.

Characteristic lines shown in FIG. 18 show experimental data during the compression stroke and the extension stroke in the case where the command signal computation processing for the wheel whose wheel load is desired to be reduced (computation processing performed mainly to obtain the absolute amount) is used for the suspension control of the vehicle.

During the period of time between 0 and Tf1 shown in FIG. 18, the value of the relative acceleration "a" is negative as indicated by a characteristic line 148 shown in a solid line, and the value of the relative velocity "v" is also negative as indicated by a characteristic line 151 shown in a solid line. Therefore, during the period of time between 0 and Tf1, the damping-force command signal I is set according to Formula 10 described above so as to be reduced from the soft command signal $I_S$ to the hard command signal $I_H$ in proportion to the relative acceleration "a" (see a characteristic line 154) by processing performed in S146, S147, and S149' shown in FIG. 14. In this manner, the damping-force on the side of the corresponding wheel is controlled so as to be gradually switched from the soft characteristic to the hard characteristic.

Then, after time Tf1 shown in FIG. 18, the value of the relative acceleration "a" changes from negative to positive. On the other hand, the value of the relative velocity "v" is negative until time Tf2. Therefore, during a period of time between Tf1 and Tf2, the damping-force command signal I is set to the hard command signal $I_H$ by the processing performed in S146, S147, and S148' shown in FIG. 14. In this manner, the wheel load of the corresponding wheel is relatively reduced during the compression stroke so as to reduce the increase in wheel load.

Next, during a period of time between Tf2 and Tf3, the relative velocity "v" has a positive value, and the relative acceleration "a" also has a positive value. Therefore, during this period of time, the damping-force command signal I is set according to Formula 9 described above so as to be increased from the hard command signal $I_H$ to the soft command signal $I_S$ in proportion to the relative acceleration "a" (see a characteristic line 154) by processing performed in S146, S154, and S156' of FIG. 14. In this manner, the damping force on the side of the corresponding wheel is controlled so as to be gradually switched from the hard characteristic to the soft characteristic.

Next, during a period of time between Tf3 and Tf4, the relative velocity "v" has a positive value, whereas the value of the relative acceleration "a" changes from positive to negative. Therefore, during the period of time between Tf3 and Tf4, the damping-force command signal I is set to the soft command signal $I_S$ by the processing performed in S146, S154, and S155' shown in FIG. 14 so that the wheel load of the corresponding wheel is relatively reduced during the extension stroke to reduce the increase in wheel load. After time Tf4, the value of the relative velocity "v" becomes negative, and the value of the relative acceleration "a" also becomes negative. Therefore, the damping-force command signal I is set according to Formula 10 described above by the processing performed in S146, S147, and S149' of FIG. 14 so as to be reduced from the soft command signal $I_S$ to the hard command signal $I_H$ in proportion to the relative acceleration "a".

As described above, according to this embodiment, in the control for obtaining the absolute amount on the side of the wheel whose wheel load is desired to be reduced, the soft-to-hard switching control during the compression stroke is performed. In this case, in the early stage of the compression stroke (for example, during the period of time between 0 and Tf1), the value of the relative acceleration "a" changes from a negative peak to zero. Therefore, by switching the damping-force command from the soft side to the hard side in proportion to the relative acceleration "a", the switching of the damping force can be completed by, for example, time Tf1. Accordingly, as indicated by the characteristic line 145 shown in a solid line in FIG. 18, the wheel load can be prevented from suddenly changing so as to be smoothly controlled for the subsequent latter stage. Then, in the latter stage of the compression stroke (for example, during the period of time between Tf1 and Tf2), the maximum amount of the wheel load can be reduced by setting the damping-force command to the hard characteristic. As a result, the wheel load can be prevented from suddenly changing so as to be smoothly controlled for the subsequent extension stroke.

The hard-to-soft switching control during the extension stroke, for switching the damping force to the hard side in the early stage of the extension stroke and to the soft side in the latter stage is performed. In this case, in the early stage of the extension stroke (for example, during the period of time between Tf2 and Tf3), the damping-force command is switched from the hard side to the soft side. As a result, the switching of the damping force can be completed by, for example, time Tf3. As a result, the wheel load can be prevented from suddenly changing so as to be smoothly controlled for the subsequent latter stage. Then, in the latter stage of the extension stroke (for example, during the period of time between Tf3 and Tf4), the effects in terms of the maximum amount can be obtained by setting the damping-force command to the soft characteristic so as not to increase the wheel load. As a result, the wheel load can be prevented from suddenly changing so as to be smoothly controlled for the subsequent compression stroke.

As described above, according to the third to sixth embodiments, the configuration as described above is used. As a result, for the wheel whose wheel load is desired to be increased among the right and left front wheels 2 and the right and left rear wheels 3, the responsiveness to increase the wheel load can be improved. In addition, the maximum amount (absolute amount) of the increase in wheel load can also be increased. On the other hand, for the wheel whose wheel load is desired to be reduced, the responsiveness to reduce the wheel load can be improved. Also, the maximum amount (absolute amount) of reduction, that is, loss in wheel load can be increased. In addition, the wheel load can be smoothly switched between the compression stroke and the extension stroke for the control. As a result, the wheel load can be prevented from suddenly changing.

Therefore, during the extension stroke or the compression stroke of each of the damping-force variable dampers 6 (9), the damping force can be smoothly switched according to the phase of a piston operation, the relative velocity "v", and the relative acceleration "a" without requiring switching time as a parameter for switching the damping-force characteristic. Therefore, the responsiveness to increase or reduce the wheel load and the absolute amount can be controlled regardless of vehicle conditions and running conditions. As a result, the operation of the vehicle can be more safely controlled.

Next, FIGS. 19 to 22 illustrate a seventh embodiment of the present invention. In the seventh embodiment, the same components as those of the third embodiment described above are denoted by the same reference symbols, and the description thereof is herein omitted.

The seventh embodiment is characterized in the following configuration. Specifically, the damping-force characteristic of the damping-force variable damper 6 (9) provided on the side of the wheel whose wheel load is to be increased among the plurality of wheels 2 and 3 is variably controlled as a damping-force characteristic proportional to the compression/extension acceleration of the corresponding damping-force variable damper, whereas the damping-force characteristic of the damping-force variable damper 6 (9) provided on the side of the wheel whose wheel load is to be reduced is variably controlled as a damping-force characteristic proportional to the compression/extension acceleration of the corresponding damping-force variable damper.

Figure 19:
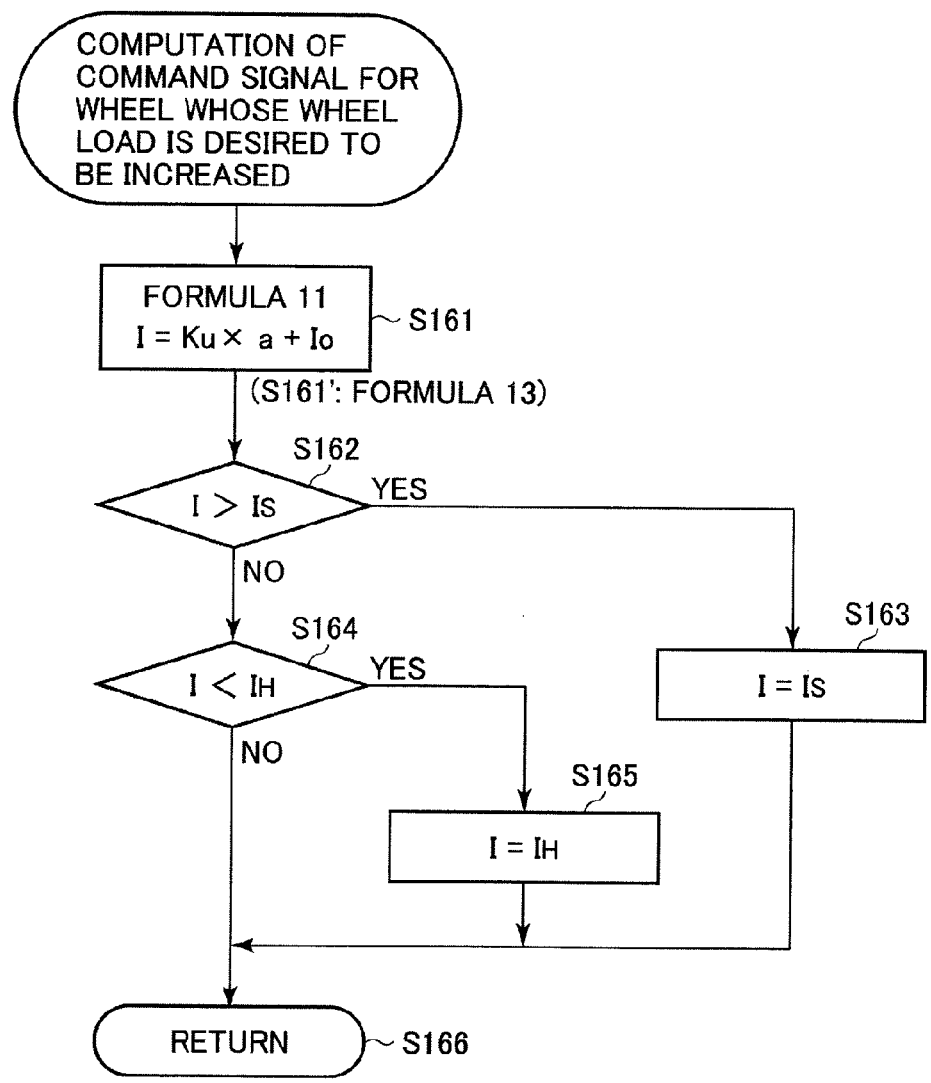
FIG. 19 is a flowchart illustrating the command-signal computation processing in the case where the damping force for the wheel whose wheel load is desired to be increased is switched, according to a seventh embodiment.

FIG. 19 illustrates command-signal computation processing for the wheel whose wheel load is desired to be increased. When a processing operation is started, a computation according to the following Formula 11 is performed in S161 so that the damping-force characteristic, specifically, the damping-force command signal I of the damping-force variable damper 6 (9) on the side of the wheel whose wheel load is desired to be increased is computed as a characteristic proportional to the compression/extension acceleration (relative acceleration "a") of the corresponding damping-force variable damper.

$$I = Ku \times a + Io \quad \text{[Formula 11]}$$

A proportionality factor Ku is a constant used when the wheel load is desired to be increased. The proportionality factor Ku and a proportionality factor Kd used when the wheel load is desired to be reduced are set to have the relation satisfied by Formula 12 described below. A constant Io is a constant determined according to, for example, experimental data. The proportionality factors Ku and Kd are also determined according to, for example, experimental data.

$$(Ku \times Kd) < 0 \quad \text{[Formula 12]}$$

In subsequent S162, whether or not the damping-force command signal I set in S161 is larger than the soft command signal $I_S$ ($I > I_S$) is determined. When it is determined as "YES" in S162, the processing proceeds to subsequent S163 in which the saturation processing is performed so as to set the damping-force command signal I to the soft command signal $I_S$. On the other hand, when it is determined as "NO" in S162, the damping-force command signal I is smaller than the soft command signal $I_S$. Therefore, the processing proceeds to subsequent S164 in which whether or not the damping-force command signal I is smaller than the hard command signal $I_H$ ($I<I_H$) is determined. When it is determined as "YES" in S164, the processing proceeds to subsequent S165 in which the saturation processing is performed so as to set the damping-force command signal I to the hard command signal $I_H$. Thereafter, in S166, the processing returns.

Figure 20:
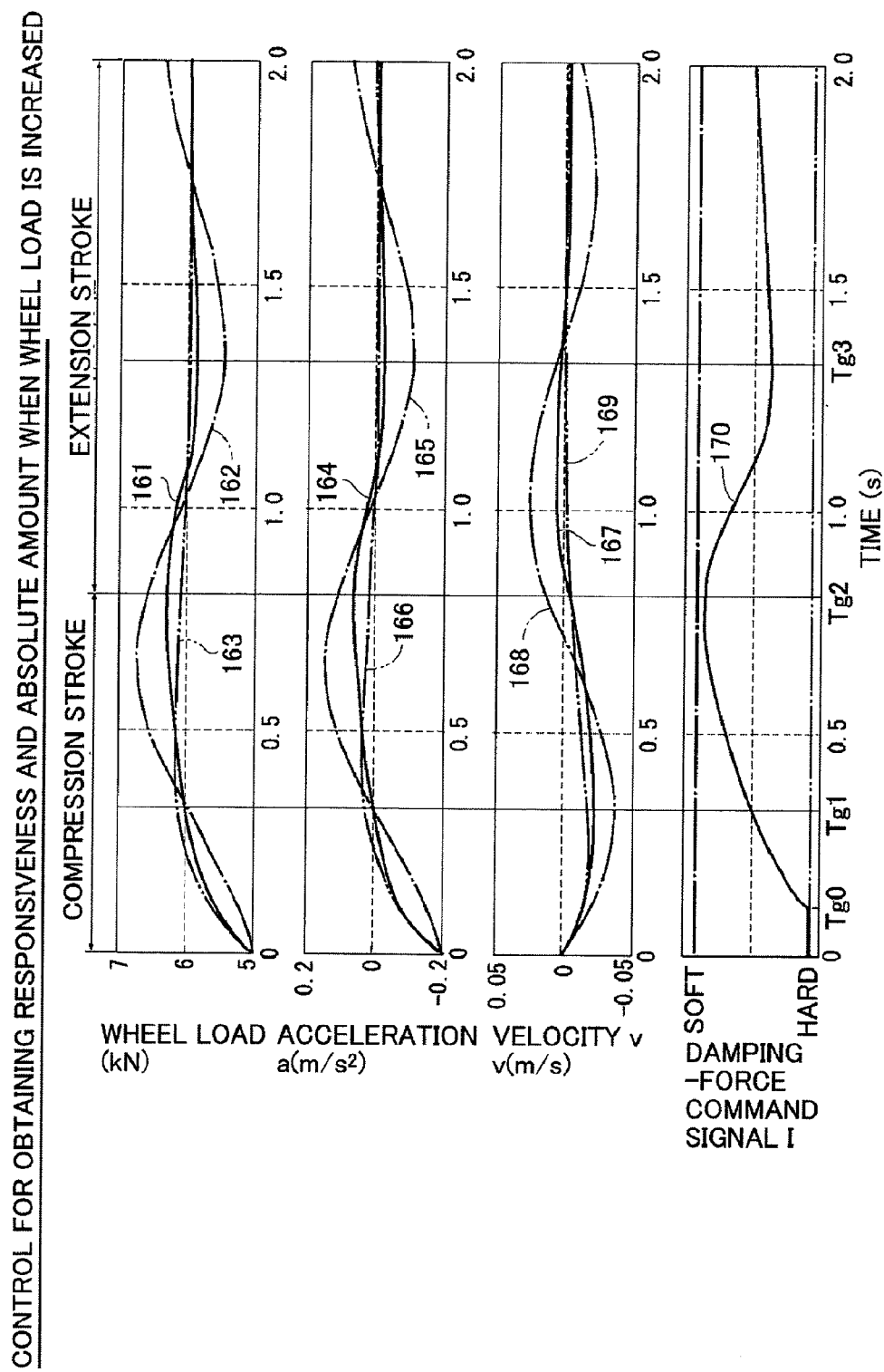
FIG. 20 is a characteristic line diagram of the wheel load, the acceleration rate, the velocity, and the damping-force command signal, for illustrating the control during the compression stroke and the extension stroke on the side of the wheel whose wheel load is desired to be increased, in comparison with the case where the damping force is fixed to the hard side and the case where the damping force is fixed to the soft side.

FIG. 20 shows comparative data of the wheel load, the relative acceleration "a", the relative velocity "v", and the damping-force command signal I, for illustrating the control during the compression stroke and the extension stroke on the side of the wheel whose wheel load is desired to be increased, in comparison with the case where the damping force is fixed to the hard side and the case where the damping force is fixed to the soft side.

A characteristic line 170 shown in a solid line in FIG. 20 indicates the damping-force command signal I of the damping-force variable damper 6 (9) according to the seventh embodiment. The damping-force command signal I is computed according to Formula 11 described above as a characteristic proportional to the relative acceleration "a". However, during a period of time between 0 and Tg0, the damping-force command signal I is set to the hard-command signal $I_H$. The setting is performed by the saturation processing performed in S164 and S165 of FIG. 19.

During a period of time between Tg0 and Tg2, the damping-force command signal I is controlled so as to be smoothly increased from the hard command signal $I_H$ to the soft side in proportion to the relative acceleration "a". During the compression stroke of the damper over the period of time between 0 and Tg2, the damping-force command signal is gradually increased so as to be set to the hard side in the early stage and be set to the soft side in the latter stage, as indicated by the characteristic line 170 shown in FIG. 20. In this manner, the damping force is smoothly switched.

During the extension stroke of the damper over a period of time between Tg2 and 2.0 seconds, the damping-force command signal is controlled so as to be on the soft side in the early stage and then be gradually switched from the soft side to the hard side. In particular, in the latter stage of the extension stroke over a period of time between Tg3 and 2.0 seconds, the damping-force command signal is controlled so as to be maintained substantially in the middle between the hard side and the soft side. Even in this case, the relative acceleration "a" sometimes vibrates in the vicinity of zero (0) due to the effects of noise or the like to be repeatedly inverted between positive and negative. In such a case, the range of value in which the relative acceleration "a" becomes nearly zero may be set. Alternatively, the fact that the phase difference between the relative velocity "v" and the relative acceleration "a" is 90 degrees may be used.

Figure 21:
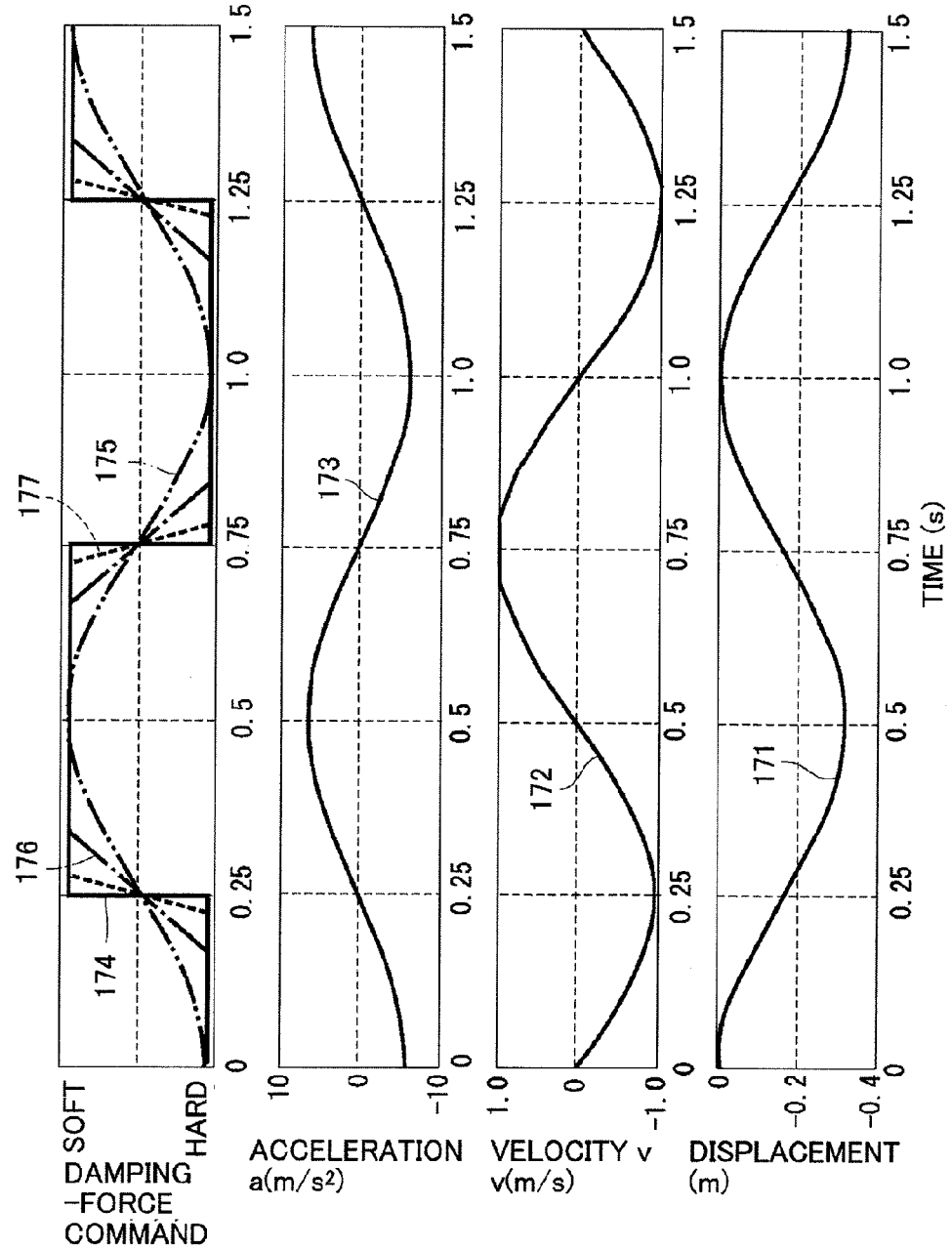
FIG. 21 is a characteristic line diagram showing the relation between the damping-force command signal, and the acceleration, the velocity, and a piston displacement of a shock absorber on the side of the wheel whose wheel load is desired to be increased as a reference example.

FIG. 21 is a characteristic line diagram illustrating the relation between the damping-force command signal of the damping-force variable damper 6 (9) provided on the side of the wheel whose wheel load is desired to be increased, the relative acceleration "a" of the damper, the relative velocity "v", and a piston displacement as a reference example. Specifically, the case where the piston of the damping-force variable damper 6 (9) is displaced along a characteristic line 171 shown in a solid line in FIG. 21 is given as an example. Then, the relative velocity "v" corresponding to a compression/extension rate of the piton can be indicated by a characteristic line 172. The relative acceleration "a" corresponding to a compression/extension acceleration of the piston can be indicated by a characteristic line 173. A characteristic line 174 shown in a solid line indicates a characteristic in the case where the damping-force command signal on the side of the wheel whose wheel load is desired to be increased is discontinuously switched between the hard side and the soft side.

(1) In a Time Block in which the Relative Velocity "v" is Negative (v<0) and the Relative Acceleration "a" is Negative (a<0)

A period of time between 0 seconds and 0.25 seconds shown in FIG. 21 corresponds to the time block in which the relative velocity "v" is negative (v<0) and the relative acceleration "a" is also negative (a<0). In general, the damping force of the damper is proportional to the relative velocity "v", whereas a spring force (force of the springs 5 and 8 illustrated in FIG. 1) is proportional to an integrated value of the relative velocity "v", specifically, the piston displacement. Therefore, in this time block, the damping force and the spring force both increase. However, a gradient of the damping force is higher. Therefore, when the damping-force command signal is set to the hard side in the time block as indicated by the characteristic line 174 shown in a solid line, the damping force can be increased. Therefore, the wheel load can be quickly increased to improve the responsiveness to increase the wheel load. On the other hand, when the damping-force command signal is set to the soft side in this time block, the speed of increasing the wheel load can be made lower to lower the responsiveness to increase the wheel load.

(2) In a Time Block in which the Relative Velocity "v" is Negative (v<0) and the Relative Acceleration "a" is Positive (a>0)

A period of time between 0.25 seconds and 0.5 seconds shown in FIG. 21 corresponds to the time block in which the relative velocity "v" is negative (v<0) and the relative acceleration "a" is positive (a>0). In this time block, the spring force is increased, whereas the damping force is reduced. In this time block, the damping force is inevitably reduced. Therefore, the wheel load cannot be increased by means of the damping force even if the damping-force characteristic is switched to any of the sides. On the other hand, the spring force still continues increasing. Therefore, the damping-force command signal is set to the soft side as indicated by the characteristic line 174 shown in a solid line in this time block. As a result, the spring becomes more likely to be compressed to increase the spring force. In this manner, the maximum amount of the wheel load can be increased (larger absolute amount). On the other hand, when the damping-force command signal is set to the hard side in this time block, the spring becomes less likely to be compressed. In this manner, the maximum amount of the wheel load can be reduced (smaller absolute amount).

(3) In a Time Block in which the Relative Velocity "v" is Positive (v>0) and the Relative Acceleration "a" is Positive (a>0)

A period of time between 0.5 seconds and 0.75 seconds shown in FIG. 21 corresponds to the time block in which the relative velocity "v" is positive (v>0) and the relative acceleration "a" is positive (a>0). In this time block, both the spring force and the damping force are reduced. In this time block, the damping force and the spring force are both reduced to reduce the wheel load. In the same idea as that for the time block (1) described above, when the damping-force command signal is set to the soft side in this time block, the speed of reducing the wheel load can be made lower (lower responsiveness). On the other hand, when the damping-force command signal is set to the hard side in this time block, the wheel load can be quickly reduced (higher responsiveness).

(4) In a Time Block in which the Relative Velocity "v" is Positive (v>0) and the Relative Acceleration "a" is Negative (a<0)

A period of time between 0.75 seconds and 1.0 seconds shown in FIG. 21 corresponds to the time block in which the relative velocity "v" is positive (v>0) and the relative acceleration "a" is negative (a<0). In this time block, the damping force is increased, whereas the spring force is reduced. In the same idea as that for the above-mentioned time block (2), the damping-force command signal is fixed to the hard side as indicated by the characteristic line 174 shown in a solid line. As a result, the spring becomes less likely to be compressed to reduce the maximum amount of the reduction in wheel load (smaller maximum amount). On the other hand, when the command signal is fixed to the soft side in this time block, the spring becomes more likely to be extended to increase the maximum amount of the reduction in wheel load (larger maximum amount).

A characteristic line 175 shown in a long dashed double-short dashed line in FIG. 21 is a characteristic obtained in the case where, for example, the proportionality factor Ku in Formula 11 described above is set smaller, and is shown as substantially the same characteristic indicated by the characteristic line 173 of the relative acceleration "a". A characteristic line 177 shown in a dot line is a characteristic obtained in the case where the proportionality factor Ku is set to a large value, whereas a characteristic line 176 shown in a long dashed short dashed line is a characteristic obtained in the case where the proportionality factor Ku is set to an intermediate value.

For obtaining the effects of both the responsiveness and the absolute amount in the case where the wheel load does not suddenly fluctuate, it is necessary to lower the effects in both the responsiveness and the absolute amount (specifically, the effects in the responsiveness and the effects in the absolute amount achieved by the control cannot be maximally demonstrated). For obtaining the effects of both the responsiveness and the absolute amount in the case where the wheel load does not suddenly fluctuate, the control for fixing the damping-force characteristic and the control for switching the damping-force characteristic may be performed in each of the time blocks (1) to (4) described above.

Thus, in the seventh embodiment illustrated in FIG. 20, during the compression stroke over the period of time between 0 and Tg2, first, a fixing time block is provided in the first half (period of time between 0 and Tg0) of the period of time between 0 and Tg1 to fix the damping-force command signal to the hard side. In this manner, the effects in the responsiveness are obtained. In the second half (period of time between Tg0 and Tg1) of the period of time between 0 and Tg1, a switching time block for the subsequent time block (period of time between Tg1 and Tg2) is provided so as to gradually switch the damping-force command signal from the hard side to the soft side.

A switching time block subsequent to the previous time block (period of time between 0 and Tg1) is provided in the first half of the time block (period of time between Tg1 and Tg2), and a fixing time block (more specifically, time block in which the damping-force characteristic is rather fixed) is provided in the second half of the time block (period of time between Tg1 and Tg2). As a result, the effects in the maximum amount can be obtained. Specifically, the damping-force characteristic is switched over the time block (period of time between 0 and Tg2).

A time block (period of time between 0 and Tg1) corresponds to a time block in which the value of the relative acceleration "a" changes from a negative peak to zero (a=0), whereas a time block (period of time between Tg1 and Tg2) corresponds to a time period in which the value of the relative acceleration "a" changes from zero (a=0) to a positive peak. Therefore, when the result obtained by multiplying the relative acceleration "a" by the constant (by the proportionality factor Ku) is used as the command signal of the damping-force characteristic, the control for continuously switching the damping-force command signal from the hard side to the soft side (or from the soft side to the hard side) can be performed over the entire compression stroke (period of time between 0 and Tg2).

The same control is performed during the extension stroke (period of time between Tg2 and 2.0 seconds). Specifically, the damping-force command signal I is set proportional to the relative acceleration "a" as expressed by Formula 11 described above. More specifically, the damping-force command signal I is obtained by a computation so as to be the damping-force characteristic proportional to a waveform signal of the compression/extension acceleration (relative acceleration "a").

As described above, the damping-force characteristic is variably controlled so that the damping-force command signal I becomes proportional to the relative acceleration "a". As a result, the effects in the responsiveness and the absolute amount can be obtained during both the compression stroke and the extension stroke of the damping-force variable damper 6 (9). Here, the damping-force command signal I is saturated at the soft command signal $I_S$ or the hard command signal $I_H$ by the saturation processing performed in S162 to S165 shown in FIG. 19. Therefore, as the proportionality factor Ku in Formula 11 described above is increased, the switching becomes closer to that (discontinuous switching) of the damping-force characteristic, corresponding to the basic concept of the control described above (see FIG. 21).

Next, command-signal computation processing for the wheel whose wheel load is desired to be reduced, which is similar to that illustrated in FIG. 19, is described. In this case, S161 of FIG. 19 is replaced by S161', and a computation expressed by Formula 13 is performed in S161'. As a result, the damping-force characteristic, that is, the damping-force command signal I of the damping-force variable damper 6 (9) on the side of the wheel whose wheel load is desired to be reduced is computed as a characteristic proportional to the compression/extension acceleration (relative acceleration "a") of the damping-force variable damper.

$$I = Kd \times a + Io \qquad \text{[Formula 13]}$$

A proportionality factor Kd is a constant used in the case where the wheel load is desired to be reduced. The proportionality factor Kd and the above-mentioned proportionality factor Ku which is used in the case where the wheel load is desired to be increased, are set to have the relation expressed by Formula 12 (Ku×Kd<0) described above. When the proportionality factor Ku is set to, for example, a positive value by Formula 12, the proportionality factor Kd is set to a negative value.

Next, similarly to the processing performed in S162 to S165, the saturation processing is performed so that the damping-force command signal I is prevented from being larger than the soft command signal $I_S$ and from being smaller than the hard command signal $I_H$ at the same time.

Figure 22:
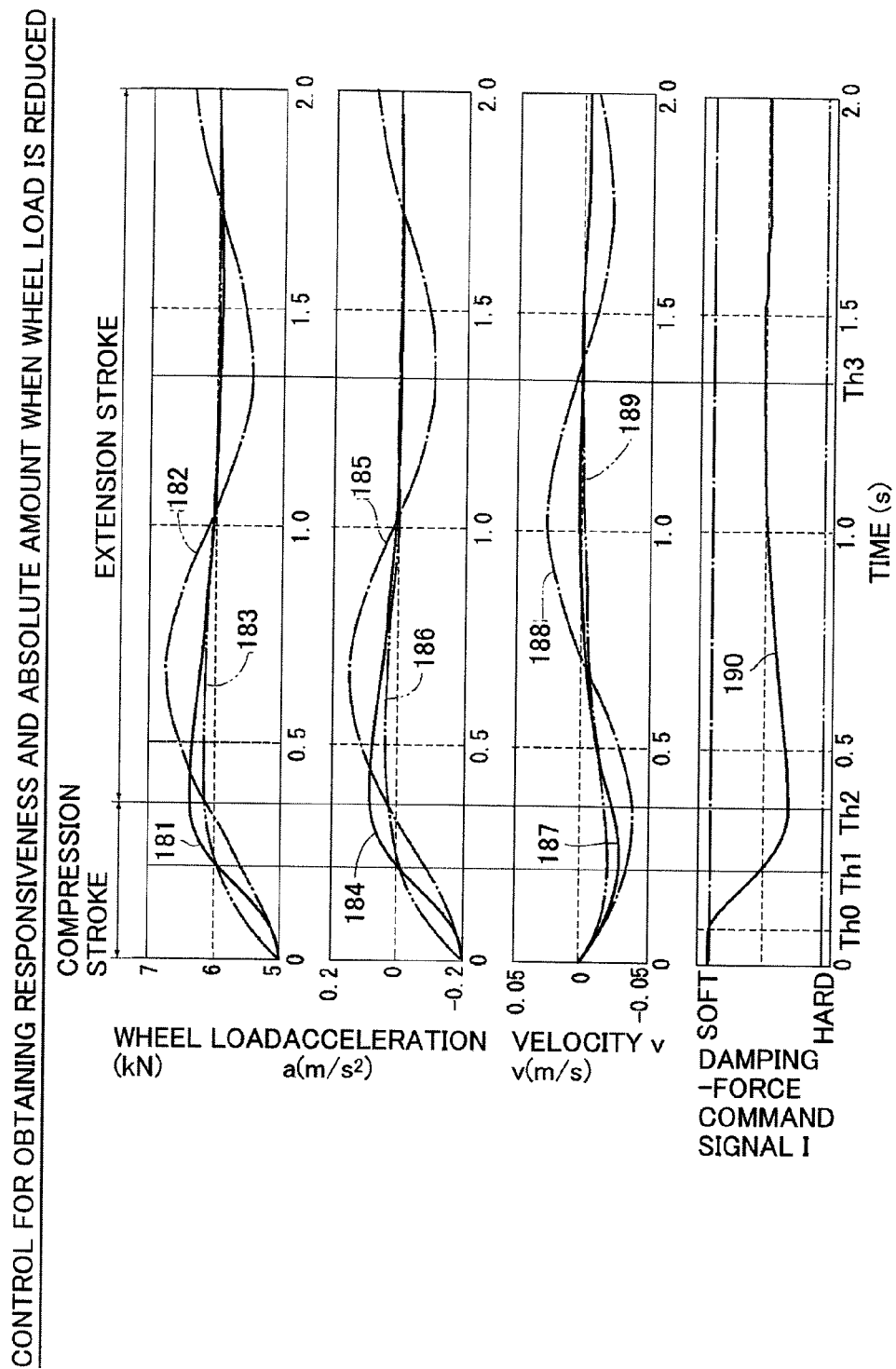
FIG. 22 is a characteristic line diagram of the wheel load, the acceleration rate, the velocity, and the damping-force command signal for showing the control during the extension stroke and the compression stroke on the side of the wheel whose wheel load is desired to be reduced, in comparison with the case where the damping force is fixed to the hard side and the case where the damping force is fixed to the soft side.

A characteristic line 190 shown in a solid line in FIG. 22 indicates the damping-force command signal I of the damping-force variable damper 6 (9) according to an eighth embodiment. The damping-force command signal I is computed according to Formula 13 described above as a characteristic proportional to the relative acceleration "a". However, during a period of time between 0 and Th0, the damping-force command signal I is set to the soft-command signal $I_S$. The setting is performed by the saturation processing performed in S162 and S163.

During a period of time between Th0 and Th2, the damping-force command signal I is controlled so as to be smoothly reduced from the soft command signal $I_S$ to the hard side in proportion to the relative acceleration "a". During the compression stroke of the damper over the period of time between 0 and Th2, the damping-force command signal is gradually reduced so as to be set to the soft side in the early stage and be set to the hard side in the latter stage, as indicated by the characteristic line 190 shown in FIG. 22. In this manner, the damping force is smoothly switched.

During the extension stroke of the damper over a period of time between Th2 and 2.0 seconds, the damping-force command signal is controlled so as to be on the hard side in the early stage and then be gradually switched from the hard side to the relatively soft side. In particular, in the latter stage of the extension stroke over a period of time between Th3 and 2.0 seconds, the damping-force command signal is controlled so as to be maintained substantially in the middle between the hard side and the soft side. Even in this case, the relative acceleration "a" sometimes vibrates in the vicinity of zero (0) due to the effects of noise or the like to be repeatedly inverted between positive and negative. In such a case, the range of value in which the relative acceleration "a" becomes nearly zero may be set. Alternatively, the fact that the phase difference between the relative velocity "v" and the relative acceleration "a" is 90 degrees may be used. In this manner, the extension stroke and the compression stroke are distinguished from each other.

Even in the eighth embodiment configured as described above, the damper control for the wheel whose wheel load is desired to be increased or reduced is performed while the damping-force characteristic is switched between the early stage and the latter stage of the compression stroke and between the early stage and the latter stage of the extension stroke, as illustrated in FIGS. 19, 20, and 22. In this manner, both of the hard and soft characteristics are achieved for the responsiveness to increase the wheel load and the maximum amount of increase in wheel load, and the responsiveness to lose the wheel load and the maximum amount of loss in wheel load.

In particular, in the eighth embodiment, during the compression stroke of the wheel whose wheel load is desired to be increased, the damping-force characteristic in the early stage is set to the hard side as indicated by the characteristic line 170 shown in FIG. 20. Then, the signal is gradually increased so as to smoothly switch the damping force. As a result, the wheel load is prevented from being suddenly lost. Therefore, the responsiveness to increase the wheel load is set at the same level as that obtained in the case where the damping-force characteristic is fixed to the hard side (indicated by the characteristic line 163), whereas the maximum amount of the wheel load is made closer to that obtained in the case where the damping-force characteristic is fixed to the soft side (indicated by the characteristic line 162). In this manner, the characteristics of both the responsiveness and the maximum amount are achieved. Moreover, even during the extension stroke of the wheel whose wheel load is desired to be increased, the damping force is smoothly switched from the soft side to the hard side. As a result, the wheel load is prevented from being suddenly lost, and the wheel-load loss is reduced as compared with the case where the damping-force characteristic is fixed to the soft side (indicated by the characteristic line 162).

On the other hand, during the compression stroke of the wheel whose wheel load is desired to be reduced, the damping-force characteristic in the early stage is set to the soft side as indicated by the characteristic line 190 shown in FIG. 22. Then, the damping force is smoothly switched from the soft side to the hard side. As a result, the wheel load is prevented from suddenly fluctuating, and the increase in wheel load is reduced to enable the reduction of the absolute amount as compared with the case where the damping-force characteristic is fixed to the soft side (indicated by a characteristic line 182).

During the extension stroke of the wheel whose wheel load is desired to be reduced, the damping-force characteristic in the early stage of the extension stroke is set to the hard side as indicated by the characteristic line 190 shown in FIG. 22. Then, the signal is gradually increased from the hard side to the soft side to smoothly switch the damping force. As a result, the wheel load is prevented from suddenly fluctuating. The responsiveness to reduce (lose) the wheel load is set at the same level as that obtained in the case where the damping-force characteristic is fixed to the hard side (indicated by a characteristic line 183), whereas the maximum value of the wheel-load loss is made larger than that obtained in the case where the damping-force characteristic is fixed to the soft side (indicated by the characteristic line 182). Accordingly, the characteristics of both the responsiveness and the maximum value are achieved.

In the seventh embodiment described above, the case where the relative acceleration "a" and the relative velocity "v" are obtained by the computations using the sprung acceleration sensors 10 and the unsprung acceleration sensors 11 has been described as an example. However, the present invention is not limited thereto. For example, the relative acceleration "a" and the relative velocity "v" may alternatively be obtained by computations using a signal from, for example, a vehicle-height sensor for detecting a height of the vehicle body 1. The above-mentioned alternative configuration can also be applied to the eighth embodiment.

In the seventh embodiment described above, the case where the damping-force characteristic of the damping-force variable damper 6 (9) provided on the side of the wheel whose wheel load is to be increased or reduced among the plurality of wheels 2 and 3 is variably controlled as a characteristic proportional to the compression/extension acceleration of the damper has been described as an example. However, the present invention is not limited thereto. For example, the damping-force characteristic of the damping-force variable damper 6 (9) may alternatively be variably controlled as a characteristic proportional to, for example, the compression/extension rate of the damping-force variable damper 6 (9), that is, the relative velocity "v".

Next, the invention encompassed in the embodiments described above is described. Specifically, in the present invention, the damping-force characteristic of the damping-force adjustable shock absorber provided on the side of the wheel whose wheel load is to be increased among the plurality of wheels is variably controlled as a damping-force characteristic proportional to the compression/extension acceleration of the damping-force adjustable shock absorber, whereas the damping-force characteristic of the damping-force adjustable shock absorber provided on the side of the wheel whose wheel load is to be reduced among the plurality of wheels is variably controlled as a damping-force characteristic proportional to the compression/extension acceleration of the damping-force adjustable shock absorber.

As described above, the damping-force characteristic is variably controlled so as to be proportional to the compression/extension acceleration of the damping-force adjustable shock absorber (relative acceleration between the sprung side and the unsprung side). As a result, the effects in the responsiveness and the absolute amount can be obtained during both the compression stroke and the extension stroke of the damping-force adjustable shock absorber.

Moreover, according to the present invention, the control means performs the control for switching the damping-force characteristic of the damping-force adjustable shock absorber between the hard side and the soft side as a characteristic proportional to the waveform signal of the compression/extension acceleration. As a result, both the hard characteristic and the soft characteristic can be achieved for the responsiveness to increase the wheel load and the maximum amount of the increase in wheel load, and the responsiveness to lose the wheel load and the maximum amount of loss in wheel load.

Further, in the present invention, there are provided the plurality of damping-force adjustable shock absorbers respectively provided between the vehicle body of the vehicle and the plurality of wheels, each damping-force adjustable shock absorber having the damping-force characteristic adjustable between the soft side and the hard side, and the control means for variably controlling the damping-force characteristic of each of the damping-force adjustable shock absorber. The control means variably controls the damping-force characteristic of one of the damping-force adjustable shock absorbers, which is provided on the side of the wheel whose wheel load is to be increased among the plurality of wheels, as a damping-force characteristic proportional to the compression/extension rate of the damping-force adjustable shock absorber, whereas the control means variably controls the damping-force characteristic of one of the damping-force adjustable shock absorbers, which is provided on the side of the wheel whose wheel load is to be reduced among the plurality of wheels, as a damping-force characteristic proportional to the compression/extension rate of the damping-force adjustable shock absorber.

Moreover, in the present invention, there are provided the plurality of damping-force adjustable shock absorbers respectively provided between the vehicle body of the vehicle and the plurality of wheels, each damping-force adjustable shock absorber having the damping-force characteristic adjustable between the soft side and the hard side, and the control means for variably controlling the damping-force characteristic of each of the damping-force adjustable shock absorber. The control means performs at least one switching control of: the hard-to-soft switching control during the compression stroke, for setting the damping-force characteristic of at least one of the damping-force adjustable shock absorbers, which is provided on a side of at least one wheel whose wheel load is to be increased among the plurality of wheels, to the hard side in the early stage of the compression stroke and then switching the damping-force characteristic to the soft side in the latter stage; the soft-to-hard switching control during the extension stroke, for setting the damping-force characteristic of at least one of the damping-force adjustable shock absorbers, which is provided on the side of the at least one wheel whose wheel load is to be increased among the plurality of wheels, to the soft side in the early stage of the extension stroke and then switching the damping-force characteristic to the hard side in the latter stage; the soft-to-hard switching control during the compression stroke, for setting the damping-force characteristic of at least one of the damping-force adjustable shock absorbers, which is provided on a side of at least one wheel whose wheel load is to be reduced among the plurality of wheels, to the soft side in the early stage of the compression stroke and then switching the damping-force characteristic to the hard side in the latter stage; and the hard-to-soft switching control during the extension stroke, for setting the damping-force characteristic of at least one of the damping-force adjustable shock absorbers, which is provided on the side of the at least one wheel whose wheel load is to be reduced among the plurality of wheels, to the hard side in the early stage of the extension stroke and then switching the damping-force characteristic to the soft side in the latter stage. Thus, the control means variably controls the damping-force characteristic in proportion to any one of the compression/extension rate and the compression/extension acceleration of the damping-force adjustable shock absorber in the middle of the switching control.

Further, in the present invention, the damping-force characteristic of the damping-force adjustable shock absorber is gradually switched between the early stage and the latter stage in at least any one of the hard-to-soft switching control during the compression stroke, the soft-to-hard switching control during the extension stroke, the soft-to-hard switching control during the compression stroke, and the hard-to-soft switching control during the extension stroke. As a result, the control for switching the damping-force characteristic between the hard side and the soft side can be smoothly performed. As a result, the wheel load can be prevented from being suddenly lost or suddenly increased to be fluctuated.

In addition, in the present invention, a braking force is applied to the wheel whose wheel load is to be increased among the plurality of wheels. As a result, a change in attitude of the vehicle, which is caused along with the braking operation of the brake, can be prevented from occurring. Therefore, the running stability can be improved.

In the embodiments described above, the case where the damping-force characteristic of each of the damping-force variable dampers 6 and 9 is switched between the hard side and the soft side when the relative acceleration between the sprung side and the unsprung side becomes zero and then is inverted to be positive or negative has been described as an example. However, the present invention is not limited thereto. For example, the damping-force characteristic may be switched between the hard side and the soft side when, for example, the relative velocity between the sprung side and the unsprung side becomes maximum during the extension stroke and the compression stroke (maximum in a negative direction during the compression stroke).

In the embodiments described above, the case where the relative acceleration and the relative velocity are obtained by the computations using the sprung acceleration sensors 10 and the unsprung acceleration sensors 11 has been described as an example. However, the present invention is not limited thereto. The relative acceleration and the relative velocity may alternatively be obtained by computations using a signal from, for example, the vehicle-height sensor for detecting the height of the vehicle body 1.

In the embodiments described above, the compression stroke and the extension stroke are distinguished from each other and the time at which the damping-force characteristic is to be switched is determined based on the relative velocity and the relative acceleration. However, the distinction and the determination may also be performed based on another physical quantity as long as the physical quantity relates to the extension and compression strokes of the shock absorber, and therefore, the displacement, a jerk, and the damping force may be used.

Next, the invention encompassed in the embodiments described above is described. Specifically, in the present invention, the damping-force characteristic of the damping-force adjustable shock absorber is gradually switched between the early stage and the latter stage in at least any one of the compression-stroke control performed when the wheel load is increased, the extension-stroke control performed when the wheel load is increased, the compression-stroke control performed when the wheel load is reduced, and the extension-stroke control performed when the wheel load is reduced.

Accordingly, the control for switching the damping-force characteristic between the hard side and the soft side can be smoothly performed. As a result, the wheel load can be prevented from being suddenly lost or suddenly increased to be fluctuated.

Further, in the present invention, the damping-force characteristic is switched when the acceleration of the extension or the compression of the damping-force adjustable shock absorber becomes zero. As a result, when the value of the relative acceleration between the sprung side and the unsprung side becomes zero and is then inverted to be positive or negative, the damping-force characteristic of the damping-force adjustable shock absorber can be switched between the hard side and the soft side.

Further, the damping-force characteristic is switched when the velocity of the extension or the compression of the damping-force adjustable shock absorber becomes maximum. As a result, when the relative velocity between the sprung side and the unsprung side becomes maximum in a positive or negative direction to be then reduced or increased, the damping-force characteristic of the damping-force adjustable shock absorber can be switched between the hard side and the soft side.

Further, the present invention is characterized in that the braking force is applied to the wheel whose wheel load is to be increased among the plurality of wheels. As a result, a change in attitude of the vehicle, which is caused along with the braking operation of the brake, is prevented from occurring to improve the running stability.

According to the above-mentioned embodiments of the present invention, a desired wheel-load characteristic can be obtained with the above-mentioned configuration.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2010-083846 filed on Mar. 31, 2010 and No. 2010-212514 filed on Sep. 22, 2010. The entire disclosure each of Japanese Patent Applications No. 2010-083846 filed on Mar. 31, 2010 and No. 2010-212514 filed on Sep. 22, 2010, including specification, claims, drawings and summary is incorporated herein by reference in its entirety.

What is claimed is:

1. A suspension control apparatus, comprising:
   damping-force adjustable shock absorbers provided between a vehicle body of a vehicle and wheels, each of the damping-force adjustable shock absorbers having a damping-force characteristic adjustable between a soft side and a hard side; and
   a controller for variably controlling the damping-force characteristic of each of the damping-force adjustable shock absorbers,
   wherein the controller performs at least one control of:
   compression-stroke control performed when a wheel load is increased, for setting the damping-force characteristic of at least one of the damping-force adjustable shock absorbers, which is provided on a side of at least one wheel whose wheel load is to be increased among the plurality of wheels, to the hard side in an early stage of a compression stroke and then switching the damping-force characteristic to the soft side in a latter stage of the compression stroke;
   extension-stroke control performed when the wheel load is increased, for setting the damping-force characteristic of the at least one of the damping-force adjustable shock absorbers, which is provided on the side of the at least one wheel whose wheel load is to be increased among the plurality of wheels, to the soft side in an early stage of an extension stroke and then switching the damping-force characteristic to the hard side in a latter stage of the extension stroke;
   compression-stroke control performed when the wheel load is reduced, for setting the damping-force characteristic of at least one of the damping-force adjustable shock absorbers, which is provided on a side of at least one wheel whose wheel load is to be reduced among the plurality of wheels, to the soft side in the early stage of the compression stroke and then switching the damping-force characteristic to the hard side in the latter stage of the compression stroke; and
   extension-stroke control performed when the wheel load is reduced, for setting the damping-force characteristic of the at least one of the damping-force adjustable shock absorbers, which is provided on the side of the at least one wheel whose wheel load is to be reduced among the plurality of wheels, to the hard side in the early stage of the extension stroke and then switching the damping-force characteristic to the soft side in the latter stage of the extension stroke.

2. A suspension control apparatus according to claim 1, wherein the damping-force characteristic is switched when an extension or compression acceleration of the at least one damping-force adjustable shock absorber becomes zero.

3. A suspension control apparatus according to claim 1, wherein the damping-force characteristic is switched when an extension or compression rate of the at least one damping-force adjustable shock absorber becomes maximum.

4. A suspension control apparatus according to claim 1, wherein the controller gradually switches the damping-force characteristic of the at least one damping-force adjustable shock absorber between the early stage and the latter stage in at least any one of the compression-stroke control performed when the wheel load is increased, the extension-stroke control performed when the wheel load is increased, the compression-stroke control performed when the wheel load is reduced, and the extension-stroke control performed when the wheel load is reduced.

5. A suspension control apparatus according to claim 4, wherein the damping-force characteristic is switched
   by variably controlling the damping-force characteristic of the at least one of the damping-force adjustable shock absorbers provided on the side of the at least one wheel whose wheel load is to be increased among the plurality of wheels as a damping-force characteristic proportional to a compression/extension acceleration of the at least one of the damping-force adjustable shock absorbers, and
   by variably controlling the damping-force characteristic of the at least one of the damping-force adjustable shock absorbers provided on the side of the at least one wheel whose wheel load is to be reduced among the plurality of wheels as a damping-force characteristic proportional to a compression/extension acceleration of the at least one of the damping-force adjustable shock absorbers.

6. A suspension control apparatus according to claim 4, wherein the damping-force characteristic is switched
by variably controlling the damping-force characteristic of the at least one of the damping-force adjustable shock absorbers provided on the side of the at least one wheel whose wheel load is to be increased among the plurality of wheels as a damping-force characteristic proportional to a compression/extension rate of the at least one of the damping-force adjustable shock absorbers, and
by variably controlling the damping-force characteristic of the at least one of the damping-force adjustable shock absorbers provided on the side of the wheel whose wheel load is to be reduced among the plurality of wheels as a damping-force characteristic proportional to a compression/extension rate of the at least one of the damping-force adjustable shock absorbers.

7. A suspension control apparatus according to claim 1, wherein the switching of the damping-force characteristic is performed by control for fixing the damping-force characteristic of the at least one damping-force adjustable shock absorber to one of the hard side and the soft side in one of the early stage of the extension stroke and the early stage of the compression stroke and then gradually changing the damping-force characteristic to the other one of the hard side and the soft side.

8. A suspension control apparatus according to claim 1, wherein the switching of the damping-force characteristic is performed by control for gradually changing the damping-force characteristic of the at least one damping-force adjustable shock absorber from one of the hard side and the soft side to the other one of the hard side and the soft side during one of the extension stroke and the compression stroke, and fixing the damping-force characteristic of the at least one damping-force adjustable shock absorber to the other one of the hard side and the soft side in the latter stage of the one of the extension stroke and the compression stroke.

9. A suspension control apparatus according to claim 1, wherein a braking force is applied to the at least one wheel whose wheel load is to be increased among the plurality of wheels.

10. A suspension control apparatus according to claim 9, wherein the braking force is applied by vehicle stability control.

11. A vehicle control apparatus, comprising:
damping-force adjustable shock absorbers provided between a vehicle body of a vehicle and wheels, each of the damping-force adjustable shock absorbers having a damping-force characteristic adjustable between a soft side and a hard side;
a controller for variably controlling the damping-force characteristic of each of the damping-force adjustable shock absorbers;
a braking device provided to each of the wheels of the vehicle; and
braking-force controller for controlling a braking force of the braking device,
wherein the controller performs at least one of:
compression-stroke control performed when a wheel load is increased, for setting the damping-force characteristic of at least one of the damping-force adjustable shock absorbers for at least one of the wheels, to which the braking force is applied by the braking-force controller, to the hard side in an early stage of a compression stroke and switching the damping-force characteristic to the soft side in a latter stage of the compression stroke; and
extension-stroke control performed when the wheel load is increased, for setting the damping-force characteristic of at least one of the damping-force adjustable shock absorbers for at least one of the wheels, to which the braking force is applied by the braking-force controller, to the soft side in an early stage of an extension stroke and switching the damping-force characteristic to the hard side in a latter stage of the extension stroke.

12. A vehicle control apparatus, comprising:
damping-force adjustable shock absorbers provided between a vehicle body of a vehicle and wheels, each of the damping-force adjustable shock absorbers having a damping-force characteristic adjustable between a soft side and a hard side;
a controller for variably controlling the damping-force characteristic of each of the damping-force adjustable shock absorbers;
a braking device provided to each of the wheels of the vehicle; and
braking-force controller for controlling a braking force of the braking device,
wherein the controller performs at least one of:
compression-stroke control performed when a wheel load is reduced, for setting the damping-force characteristic of at least one of the damping-force adjustable shock absorbers for at least one of the wheels, which is free from application of the braking force when the braking-force controller applies the braking force to any of the wheels, to the soft side in an early stage of a compression stroke and switching the damping-force characteristic to the hard side in a latter stage of the compression stroke; and
extension-stroke control performed when the wheel load is reduced, for setting the damping-force characteristic of at least one of the damping-force adjustable shock absorbers for at least one of the wheels, which is free from application of the braking force when the braking-force controller applies the braking force to any of the wheels, to the hard side in an early stage of an extension stroke and switching the damping-force characteristic to the soft side in a latter stage of the extension stroke.

* * * * *